US009928662B2

(12) United States Patent
Palmaro

(10) Patent No.: US 9,928,662 B2
(45) Date of Patent: Mar. 27, 2018

(54) SYSTEM AND METHOD FOR TEMPORAL MANIPULATION IN VIRTUAL ENVIRONMENTS

(71) Applicant: Unity IPR ApS, Copenhagen K (DK)

(72) Inventor: Gregory Lionel Xavier Jean Palmaro, Paris (FR)

(73) Assignee: Unity IPR ApS, Copenhagen (DK)

( * ) Notice: Subject to any disclaimer, the term of this patent is extended or adjusted under 35 U.S.C. 154(b) by 0 days.

(21) Appl. No.: 15/588,334

(22) Filed: May 5, 2017

(65) Prior Publication Data
US 2017/0323483 A1 Nov. 9, 2017

Related U.S. Application Data

(60) Provisional application No. 62/333,509, filed on May 9, 2016.

(51) Int. Cl.
G06T 19/00 (2011.01)
G06F 3/01 (2006.01)

(52) U.S. Cl.
CPC .......... G06T 19/006 (2013.01); G06F 3/011 (2013.01); G06F 3/014 (2013.01); G06F 3/017 (2013.01)

(58) Field of Classification Search
None
See application file for complete search history.

(56) References Cited

U.S. PATENT DOCUMENTS

2013/0104085 A1* 4/2013 Mlyniec .............. G06F 3/04845
715/849
2016/0306431 A1* 10/2016 Stafford .................. G06F 3/014

* cited by examiner

Primary Examiner — Vu Nguyen
(74) Attorney, Agent, or Firm — Schwegman Lundberg & Woessner, P.A.

(57) ABSTRACT

A system includes a first and a second hand tracking device, the first and second hand tracking devices being configured to provide position information associated with hands of a user; hardware processors; a memory; and a temporal manipulation module. The temporal manipulation module is configured to perform operations including recording changes made in a virtual reality (VR) environment involving the user, thereby creating a recorded content, detecting a first revolution gesture performed by the user with the first and second hand tracking devices, the first revolution gesture including the first and second hand tracking devices revolving in a circular motion about a common axis, stopping the recording based on detecting the first revolution gesture, rewinding through the recorded content based on the first revolution gesture and, during the rewinding, displaying the recorded content in the VR environment, the displaying including altering the VR environment based on the recorded content.

20 Claims, 20 Drawing Sheets
(14 of 20 Drawing Sheet(s) Filed in Color)

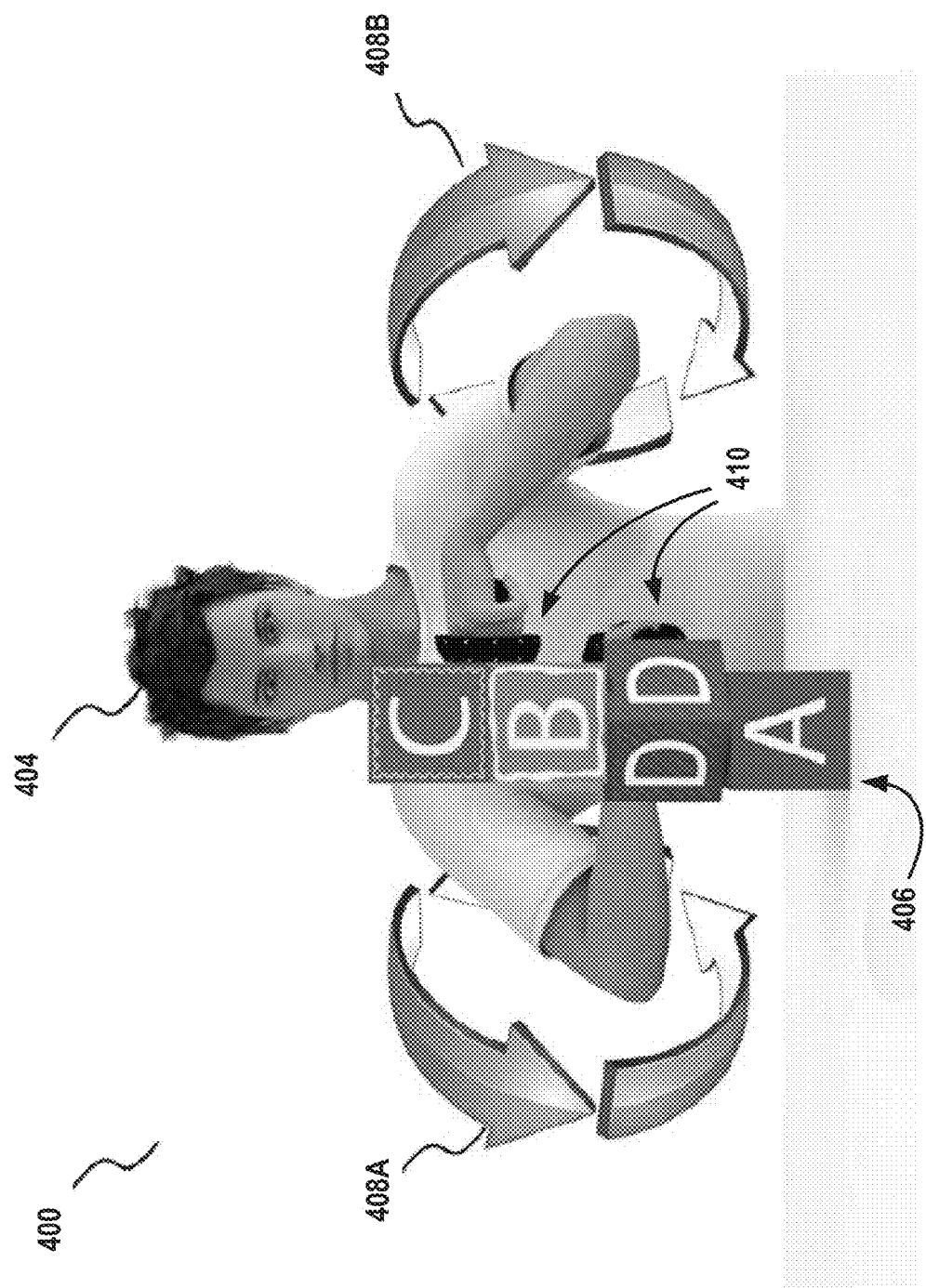

SYSTEM AND METHOD FOR TEMPORAL MANIPULATION IN VIRTUAL ENVIRONMENTS

RELATED APPLICATIONS

This application claims the benefit of priority to U.S. Provisional Patent Application Ser. No. 62/333,509, filed May 9, 2016, herein incorporated by reference in its entirety.

TECHNICAL FIELD

The present disclosure relates to the field of virtual reality and, more specifically, to systems and methods for providing software tools for temporal manipulation in a virtual reality environment.

BACKGROUND

Various tools exist to allow software users to undo previous actions when using software on traditional computers with two dimensional (2D) (e.g., flat screen) display devices. Typically, a user is presented with an 'undo' button in a 2D user interface, or the user can program an 'undo' button on a device such as a mouse. Users that use creation software within a virtual reality environment make mistakes within creation software. However, in virtual reality (VR), where users are immersed in a virtual world while using software (e.g., during development), aspects of known 2D interface mechanics, such as the projection of such buttons in the virtual surroundings, may be undesirable.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Various ones of the appended drawings merely illustrate example embodiments of the present disclosure and cannot be considered as limiting its scope, and in which:

FIG. 4B is a view of the environment illustrating example gestures (collectively, "the forward gesture") in a forward circular motion, wherein both the left and right handhelds are a small distance from each other and follow the revolution as illustrated;

The headings provided herein are merely for convenience and do not necessarily affect the scope or meaning of the terms used. Like numbers in the Figures indicate like components.

In the description below, the term "module" refers broadly to software, hardware, or firmware (or any combination thereof) components. Modules are typically functional components that can generate useful data or other output using specified input(s). A module may or may not be self-contained. An application program (also called an "application") may include one or more modules, or a module can include one or more application programs.

DETAILED DESCRIPTION

The description that follows describes systems, methods, techniques, instruction sequences, and computing machine program products that constitute illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details.

There is described herein a VR interaction system and a method for recording user actions within a virtual reality environment and presenting to a user temporal control over the recorded actions. In an example embodiment, the VR interaction system provides temporal control actions to the user (e.g., a VR game developer) through a series of user-performed gestures performed by the user using hand tracking devices (e.g., one or more input devices tracking motion of the user, such as handheld tracking devices or optical tracking devices). The VR interaction system displays a VR environment to the user through a head mounted display (HMD), and enables the user to interact with the VR environment through the tracking devices.

The VR interaction system provides the user a gesture-based undo mechanism in a virtual reality environment that includes hand tracking devices or technology. The VR interaction system provides a "recording mode", a "rewind mode", and a "forward mode" that allows the user to visually see their actions unfold in forward or reverse order, moving through the recorded actions while seeing the VR environment during a forward or rewind. This allows users, for example, to rewind their recent changes to a precise point in the creation process in order to take a different path, thereby undoing some changes.

Figure 1:
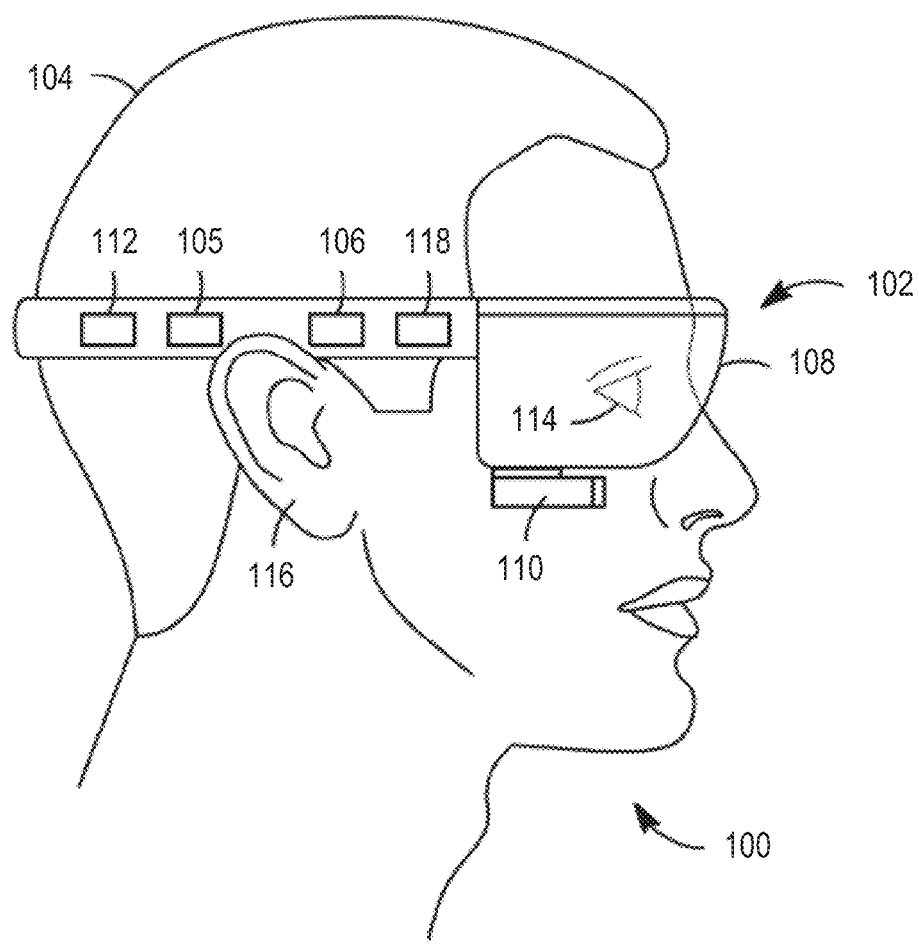
FIG. 1 is a diagram of an example head-mounted display (HMD), worn by a user (or "wearer")

FIG. 1 is a diagram of an example head-mounted display (HMD) 102, worn by a user (or "wearer") 100. In the example embodiment, the user 100 (e.g., a game developer) experiences a VR environment or augmented reality (AR) content while wearing the HMD 102. The HMD 102 includes an opaque visor 108 which may obscure the wearer 100's view of the real world, and on which a complete virtual environment may be displayed. In other embodiments, the HMD 102 may include a transparent or semi-transparent visor (or "lens", or "lenses") 108 through which the wearer 100 views their surroundings (also herein referred to also as "the real world"). It should be understood that the visor 108 is illustrated in FIG. 1 as transparent for purposes of illustration but, as described above, the visor 108 may be transparent or semi-transparent in some embodiments (e.g., AR or mixed reality (MR), or opaque in others (e.g., VR).

In the example embodiment, the HMD 102 also includes a display device 118 that renders graphics (e.g., virtual objects) onto the visor 108. As such, the visor 108 acts as a "screen" or surface on which the output of the display device 118 appears, and through which the wearer 100 experiences virtual content. The display device 118 is driven or controlled by one or more GPUs 106 or holographic projection units (HPUs). The GPU 106 processes aspects of graphical output that assists in speeding up the rendering of output through the display device 118.

In the example embodiment, the HMD 102 also includes one or more central processing units (CPUs) 105 that may execute some of the operations and methods described herein. The HMD 102 also includes an audio device 112 (e.g., speakers, not separately depicted) that is configured to present audio output to the wearer 100 (e.g., via ears 116 of the user 100). While not separately shown, the HMD 102 also includes wired or wireless network adapters (e.g., Wi-Fi, Bluetooth, cellular) that facilitate communication between the HMD 102 and other computing devices described herein.

In some embodiments, the HMD 102 includes a digital camera device 110. The digital camera device (or just "camera") 110 is a forward-facing video input device that is oriented so as to capture at least a portion of a field of view (FOV) of the wearer 100. In other words, the camera 110 captures or "sees" an angle of view of the real world based on the orientation of the HMD 102 (e.g., similar to what the wearer 100 sees in the wearer 100's FOV when looking through the visor 108). The camera devices 110 may be configured to capture real-world digital video around the user 100 (e.g., a field of view, a peripheral view, or a 360° view around the wearer 100). The camera devices 110 may be used to capture digital video of the real world environment around the user 100. In some embodiments, output from the digital camera device 110 may be projected onto the visor 108 (e.g., in opaque visor embodiments), and may also include additional virtual content (e.g., added to the camera output). In some embodiments, the camera 110 may be a depth camera, or the HMD 102 may otherwise include a depth sensor, capturing depth information for objects within the FOV of the user 100.

In some embodiments, the HMD 102 may include one or more sensors (not separately shown), or may be coupled in wired or wireless communication with the sensors (e.g., via near-field communication (NFC) with a wrist-wearable device also worn by the wearer 100). For example, the HMD 102 may include motion or position sensors configured to determine a position or orientation of the HMD 102. In some embodiments, the HMD 102 may include a microphone for capturing audio input (e.g., spoken vocals of the user 100).

In some embodiments, the HMD 102 may be similar to virtual reality HMDs such as the Oculus Rift™, The HTC Vive™, The Playstation VR™, and the like. In some embodiments, the user 100 may hold one or more hand tracking devices ("handhelds") (not separately shown in FIG. 1) (e.g., one in each hand). The handhelds provide information about the absolute or relative position and orientation of a user's hands and, as such, are capable of capturing hand gesture information. The handhelds may be configured to operate directly with the HMD 102 (e.g., via wired or wireless communication). In some embodiments, the handhelds may be Oculus Touch™ hand controllers, HTC Vive™ hand trackers, or Playstation VR™ hand controllers. The handhelds may also include one or more buttons or joysticks built into the handheld. In other embodiments, the user 100 may wear one or more wearable hand tracking devices (e.g., motion tracking gloves, not shown), such as those made commercially available by Manus VR (Netherlands). In still other embodiments, hand motion of the user 100 may be tracked without, or in addition to, the handhelds or wearable hand tracking devices via a hand position sensor (not shown, e.g., using optical methods to track the position and orientation of the user's hands) such as, for example, those made commercially available by Leap Motion, Inc. (a California corporation). Such hand tracking devices (e.g., handhelds) track the position one or more of the hands of the user during operation.

During operation, in the example embodiment, the HMD 102 is mounted on a head 104 of the wearer, and over both eyes 114 of the wearer 100, as shown in FIG. 1. The wearer 100 may be presented with a virtual environment which may be viewed and edited via the HMD 102 and handhelds as described herein.

Figure 2:
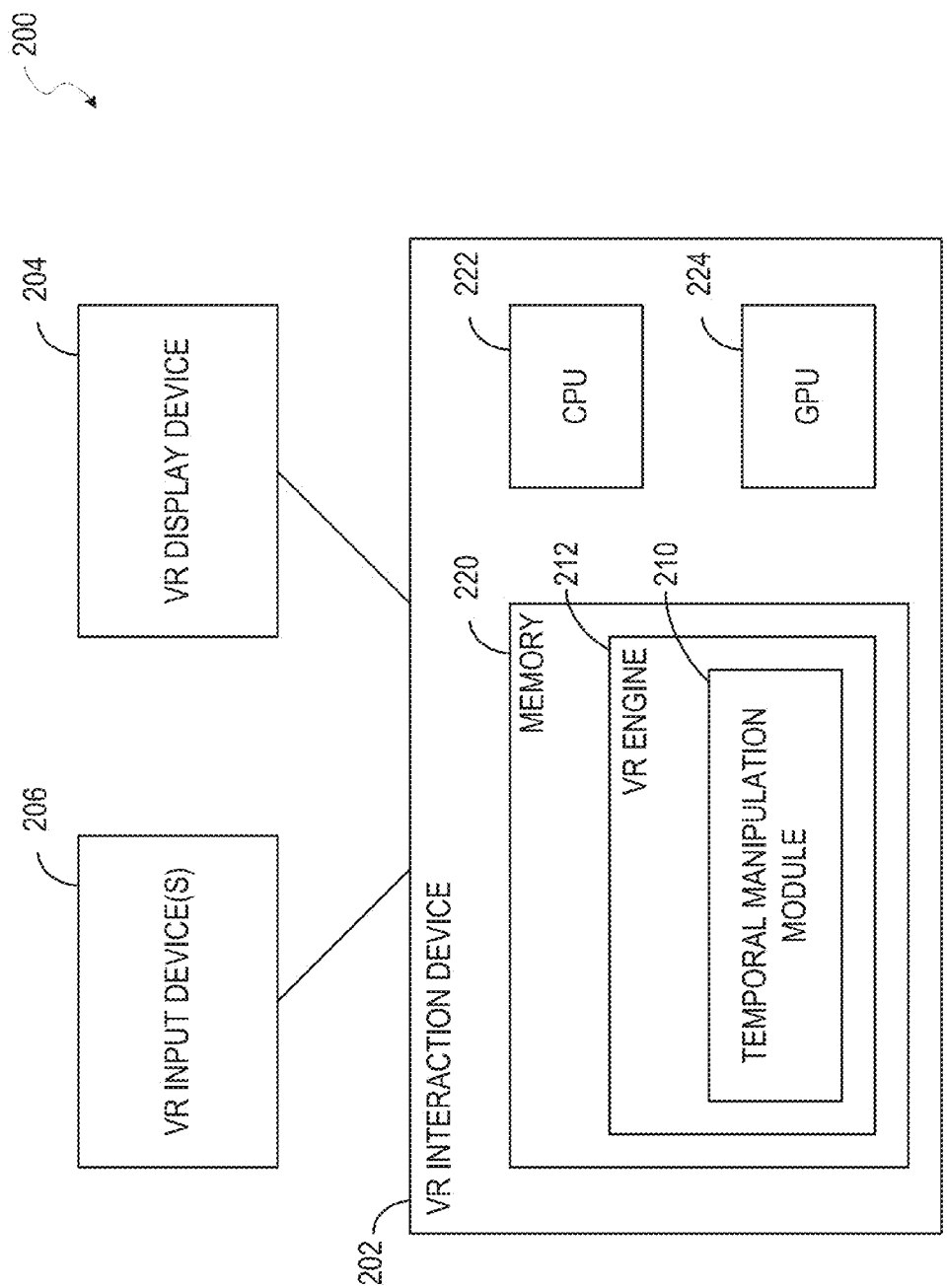
FIG. 2 is a component diagram of a VR interaction system that includes components similar to the HMD and the handhelds discussed in relation to FIG. 1.

FIG. 2 is a component diagram of a VR interaction system 200 that includes components similar to the HMD 102 and the handhelds discussed in relation to FIG. 1. In the example embodiment, the VR interaction system 200 includes a VR interaction device 202, a VR display device 204, and one or more VR input devices 206. In some embodiments, the VR display device 204 may be similar to the visor 108, and the VR input device(s) 206 may be similar to the handhelds or other tracking devices described above in reference to FIG. 1.

In the example embodiment, the VR interaction device 202 includes a memory 220, one or more CPUs 222, and one or more GPUs 224 or HPUs. In some embodiments, the CPU 222 may be similar to the CPU 105, the GPU 224 may be similar to the GPU 106, and the VR interaction device 202 may be a part of the HMD 102. In some embodiments, the VR interaction system 200 and the various associated hardware and software components described herein may provide AR content instead of, or in addition to, VR content (e.g., in a mixed reality (MR) environment). It should be understood that the systems and methods described herein may be performed with AR content and, as such, the scope of this disclosure covers both AR and VR applications.

In the example embodiment, VR interaction device 202 includes a VR engine 212, executed by the CPU 222 and/or GPU 224, that provides a VR environment through the VR display device 204 (e.g., to the user 100). The VR engine 212 includes a temporal manipulation module 210 that enables various aspects of temporal control actions for the user 100 within the VR environment as described herein. The temporal manipulation module 210 may be implemented within, or communicate with, a larger more generic VR software application such as the VR engine 212 (e.g., a virtual reality editing application).

The temporal manipulation module 210 and the VR engine 212 include computer-executable instructions residing in the memory 220 that are executed by the CPU 222 and optionally with the GPU 224 during operation. The VR engine 212 communicates with the VR display device 204 (e.g., the HMD 102) and also with other VR hardware such as the VR input device(s) 206 (e.g., motion capture devices such as the handhelds). The temporal manipulation module 210 may be integrated directly within the VR engine 212, or may be implemented as an external piece of software (e.g., a plugin).

During operation, and in the example embodiment, all actions performed by the user 100 within the VR engine 212, as well as data associated with virtual objects affected by those actions, are recorded by the temporal manipulation module 210. For example, the user 100 may be using the VR engine 212 to create a new virtual environment, and the actions refer to the user 100 creating and manipulating objects within the environment. The user actions may include, for example, position, orientation, and motion (POM) information of the user 100 (e.g., from the various VR input devices 206), or POM and state information of virtual objects within the virtual environment and with which the user 100 interacts during a recorded session. The POM information may include POM of the head of the user (e.g., as provided by the HMD 102), POM of the hands of the user (e.g., as provided by the handhelds), POM of the affected virtual objects altered by the user 100, and the voice commands of the user (e.g., as provided by a microphone, not separately depicted). For example, the POM of the head of the user 100 is determined by sensors in the HMD 102, or by an external head tracking device (e.g., external optical motion tracking device). The POM of the hands of the user is determined by sensors in handheld devices (e.g., the handhelds), or by an external hand tracking device. The voice commands of a user are recorded by a microphone (e.g., in the HMD).

The user actions are received and interpreted by the VR engine 212 and the temporal manipulation module 210, and are converted into virtual actions within the VR environment. These virtual actions are recorded by the temporal manipulation module 210, wherein the recording includes information on the order of the sequence of the virtual actions. Since the virtual actions and the order in which they occurred are recorded, they can be manipulated as if they are actions on a timeline, as described in greater detail below.

Figure 3:
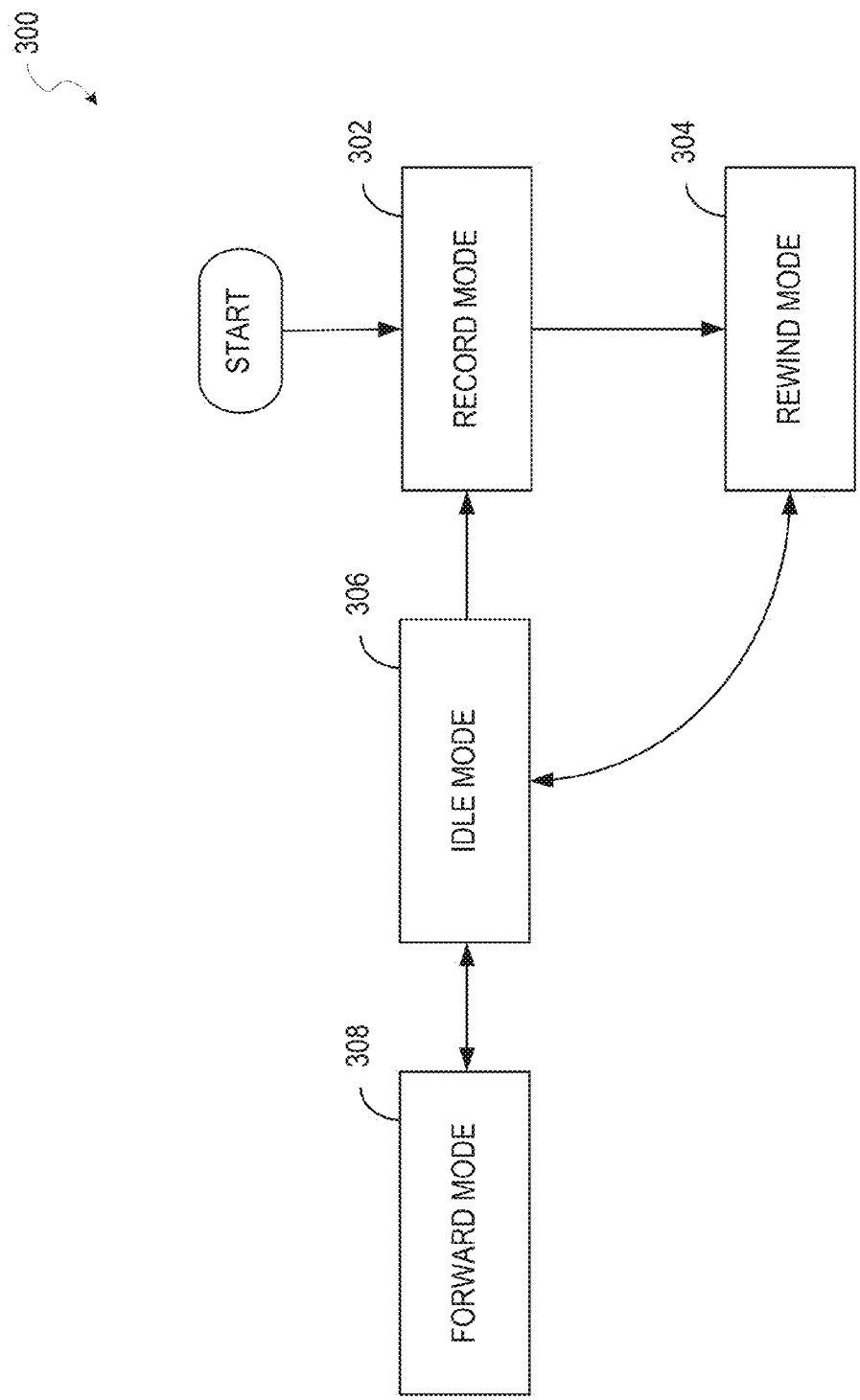
FIG. 3 is an example flow control diagram used by the temporal manipulation module during a temporal manipulation process.

FIG. 3 is an example flow control diagram 300 used by the temporal manipulation module 210 during a temporal manipulation process. In the example embodiment, The VR engine 212 enables the user 100 to build and modify a virtual scene (e.g., the building and modifying being done with user actions and virtual actions). The user 100 performs tasks in a VR environment provided by the VR engine 212 such as, for example, creating or deleting virtual objects, repositioning virtual objects, or editing virtual objects. The term "user actions," as used herein, refers to real-world actions performed by the user (e.g., manipulation of the handhelds and the HMD 102). The term "virtual actions," as used herein, refers to complementary actions occurring within the VR environment in response to user actions (e.g., a virtual hand moving around in the VR environment as the user 100 moves their physical hand, or the perspective of the VR environment rotating as the user 100 rotates their head). In other words, real-world user actions are detected by the VR engine 212, which thereby cause the VR engine 212 to perform some virtual actions within the VR environment.

In the example embodiment, the temporal manipulation module 210 provides a temporal manipulation function for reviewing, and potentially undoing, virtual actions within the virtual environment. More specifically, the temporal manipulation module 210 allows the user 100 to enter (e.g., start) a record mode 302 wherein the user actions and virtual actions are recorded by the temporal manipulation module 210. In some embodiments, the temporal manipulation module 210 records virtual environment data of the user 100, the HMD 102, the handhelds, and affected virtual objects (e.g., POM information within the virtual environment). In some embodiments, the temporal manipulation module 210 may additionally, or alternatively, record real-world data of the user 100, the HMD 102, and the handhelds (e.g., real-world POM data from the real world).

From the record mode 302, the user 100 can choose to enter a rewind mode 304. In rewind mode 304, the temporal manipulation module 210 undoes (e.g., rewinds) virtual actions in the VR environment (e.g., one at action at a time). In other words, when the user 100 initiates a rewind of a recorded session, the temporal manipulation module 210 reverses (e.g., rewinds) the recorded actions of the user, thereby causing the user 100 to see the recorded virtual actions happening in reverse order. In rewind mode 304, the recording of the user actions and virtual actions is stopped. While in rewind mode 304, the user 100 can control the speed at which the rewinding occurs and the user 100 can stop rewinding during any recorded action. In some embodiments, the rewinding and forwarding of actions during viewing of a recorded session is performed in a continuous linear flow (e.g., based on revolution speed of the gesture, such as showing the virtual objects or handhelds within the virtual environment as the entire change operation is done or undone). In other embodiments, the rewinding and forwarding of actions may be performed in discrete steps (e.g., based on a threshold degree of revolution of the gesture, such as undoing one whole change operation for every quarter revolution). The temporal manipulation module 210 enables these transitions via user gestures described in greater detail below.

When the user 100 exits rewind mode 304 (e.g., stops rewinding), they enter an idle mode 306. In idle mode 306, the temporal manipulation module 210 is not recording, and the virtual actions are paused at a point in time (e.g., based on wherever the user 100 stopped rewinding). From the idle mode 306, the user 100 may do any one of three things: the user 100 may return to rewind mode 304 (e.g., continue rewinding), the user 100 may go into a forward mode 308 and move forward through the virtual actions (e.g., through the virtual actions recently rewound); or the user 100 may switch back to record mode 302, resuming the previous recording session from the moment (e.g. within the virtual actions) where the idle mode 306 was entered. In some embodiments, upon re-entry into the record mode 302, any virtual actions that were ahead (e.g. in the future) of said moment are erased, having effectively been undone by the rewind.

FIGS. 4A-10 illustrate example views of a VR environment 400, provided by the VR interaction device 202 (e.g., the VR engine 212), in which the temporal manipulation module 210 provides temporal manipulation actions. FIGS. 4A-10 include an avatar 404 of the user 100 holding a handheld 410 in each hand and manipulating several virtual blocks 406. In the example embodiment, the VR interaction device 202 presents the avatar 404 within the VR environment 400 to approximate aspects of a real-world position of a user (e.g., the user 100) using one or more of the VR input devices 206 (e.g., head position and orientation via the HMD 102, hand position and orientation via the handhelds 410). In other words, as the user 100 wears the HMD 102 and holds the real-world handhelds 410, the avatar 404 in the VR environment 400 mirrors certain aspects of the position and orientation of the user 100. In some embodiments, the handhelds 410 may be wearable devices (e.g., gloves). In other embodiments, the handhelds 410 may not be present, and the gesture mechanisms described herein may be determined based on the hands of the user 100 (e.g., with no handhelds 410). It should be understood that many aspects of the examples illustrated herein are described in relation to handhelds 410, but may apply as well to embodiments without handhelds. Further, it should be understood that the entire avatar 404 of the user 100 may or may not appear in the virtual environment 400, but is shown in these figures for ease of illustration. In some embodiments, just the hands or the handhelds of the user 100 may be displayed within the virtual environment 400.

During operation, the temporal manipulation module 210 monitors user gestures (e.g., hand or finger gestures) performed by the user 100 and performs reciprocal actions when specific gestures are detected. For example, hand or finger movements may be tracked using the handhelds 410, or with the external tracking devices. While FIGS. 4A-10 illustrate the VR environment 400, it should be understood that FIGS. 4A-10 show the avatar 404 and handhelds 410 as appearing in the VR environment 400 for purposes of illustrating various aspects of this disclosure (e.g., motion of the real-world user 100 and handhelds 410), but the avatar 404 and the handhelds 410 may or may not actually appear in the VR environment 400. In other words, the gesture mechanics are illustrated in the VR environment 400 (e.g., with respect to the motions of the avatar 404) for convenience of illustration and discussion, and the gesture mechanics illustrated in FIGS. 4A-10 are performed by the user 100 in the real world (e.g., as read through the VR input devices 206) and may trigger the actions shown and described herein within the VR environment 400.

Figure 4A:
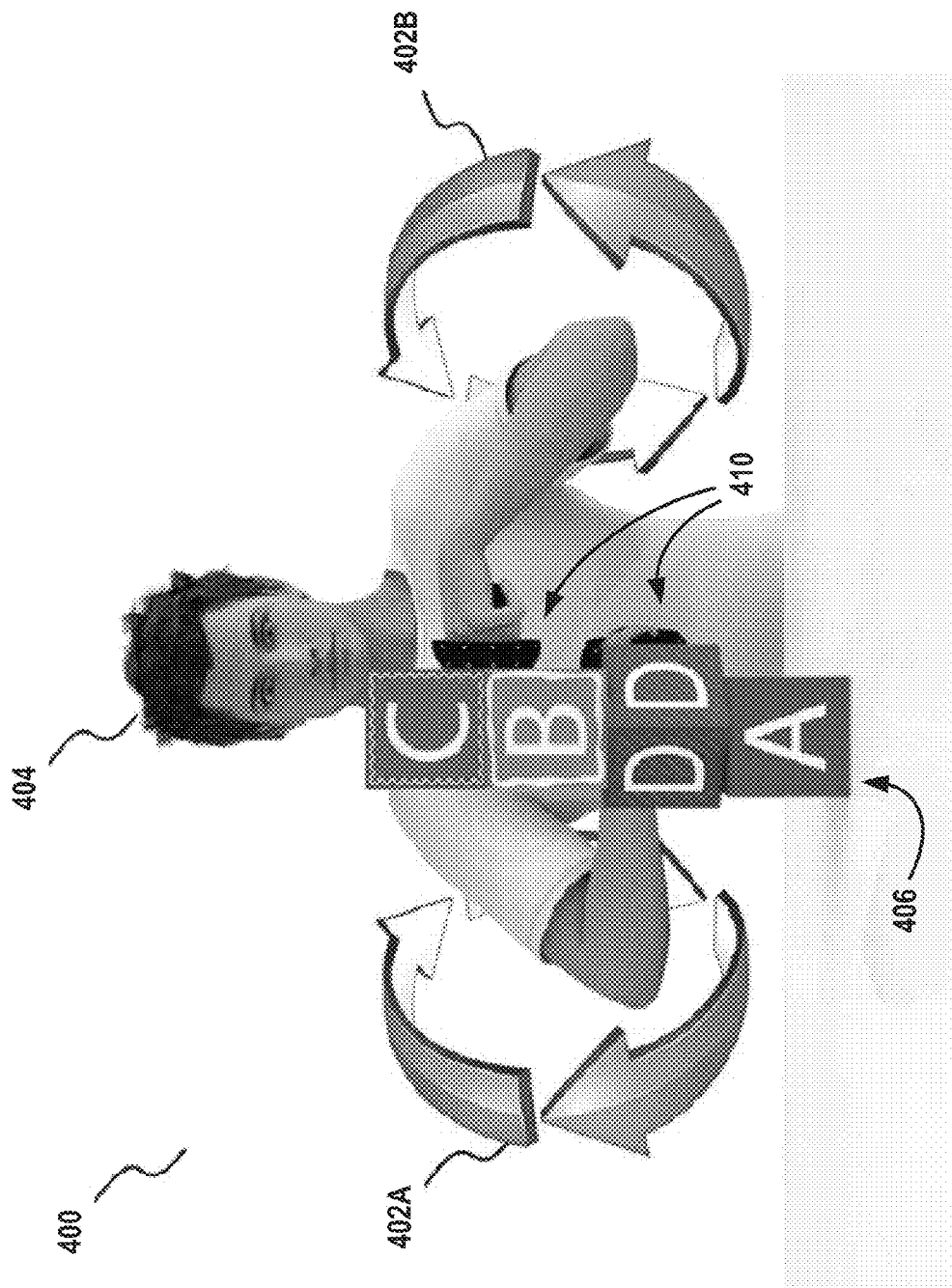
FIG. 4A is a view of the environment illustrating example gestures made by the user using the handhelds, and mirrored by the avatar in the VR environment.

FIG. 4A is a view of the VR environment 400 illustrating example gestures 402A, 402B made by the user 100 using the handhelds 410, and mirrored by the avatar 404 in the VR environment 400. In the example embodiment, the temporal manipulation module 210 detects the gestures 402A, 402B (collectively, gesture 402, or "the rewind gesture" 402) and, upon detection, initiates the rewind mode 304 (e.g., causing the rewinding of recorded virtual actions). The gestures 402A, 402B are detected via the handhelds 410, and the temporal manipulation module 210 initiates the rewind mode 304 when the combination of gestures 402A, 402B is detected. The rewind gesture 402 is performed by the user 100 revolving both hands such that the two handhelds 410 revolve about a common axis. In the example embodiment, the gesture 402 also includes the two handhelds 410 revolving around each other in a circular motion (e.g., both clockwise, or both counter-clockwise). In some embodiments, the gesture 402 may be detected when the handhelds 410 are approximately vertically coplanar (e.g., sharing a vertical plane in front of the user 100). The combination of gestures 402A and 402B may be referred to herein as a single gesture 402 (e.g., a combined gesture that has separate significance when detected together in conjunction). In other embodiments, the rewind and forward gesture 402, 408 directions may be reversed.

In the example shown, FIG. 4A illustrates the rewind gesture 402 as a reverse circular motion, wherein both the left and right handhelds 410 are a small distance from each other and follow the revolution as illustrated. In some embodiments, the handhelds 410 share a vertical plane approximately parallel to an axis about which the user 100 revolves the handhelds 410. In other words, for each hand, when the handheld 410 is at the top of the circular path, it is traveling towards the user 100, and when the handheld 410 is at the bottom of the circular path, it is traveling away from the user 100. In some embodiments, the plane of revolution is also approximately aligned with a vertical axis of the avatar (e.g., the core of the user 100).

In some embodiments, the speed or rate at which the handhelds 410 revolve (e.g., the rate of revolution of the handhelds 410 or hands of the user 100) is linked to the speed at which virtual actions are rewound or forwarded (e.g., as a linear function). As used herein, the terms "speed of revolution" or "velocity of revolution" refer to the speed and direction at which the user 100 performs the revolving gesture 402, and the term "temporal speed" refers to the speed and direction of movement through the content (e.g., speed of rewinding or forwarding through the recorded changes). For example, a single revolution may be equivalent to a predefined amount (e.g., 1 second) of movement through the content (e.g., a temporal speed of 1 second for each revolution).

In some embodiments, the temporal manipulation module 210 may provide multiple tiers or thresholds of revolution rates that provide differing amounts of temporal velocity through the content. For example, the temporal manipulation module 210 may provide a first tier revolution rate of less than one revolution per second that equates to 1 second of temporal velocity per revolution, a second tier revolution rate of between one and two revolutions per second that equates to 3 seconds of temporal velocity per revolution, and a third tier revolution rate of greater than 2 revolutions per second that equates to 10 seconds of temporal velocity per revolution. As such, altering the temporal velocity based on the revolution rate provides the user 100 an additional degree of control over the motion through the content.

In some embodiments, the temporal speed may be dynamically determined (e.g., based on a distance between the two handhelds 410 or two hands of the user 100, referred to herein as a separation distance). The temporal manipulation module 210 may provide tiers of temporal speeds based on the separation distance. For example, the temporal manipulation module 210 may provide a faster temporal speed if the user 100 revolves the handhelds 410 in a tight circle (e.g., 10 second temporal velocity if less than 2 inches of separation), and may provide a slower temporal speed if the user 100 revolves the handhelds 410 in a wider circle (e.g., 5 second temporal speed if between 2 inches and 5 inches of separation), and an even slower rate of revolution if the user 100 revolves the handhelds 410 in an even wider circle (e.g., 2 second temporal velocity if greater than 5 inches of separation). In other embodiments, the temporal speed may be a continuous (e.g., not tiered) function based on the separation distance. For example, the temporal speed may be a pre-determined revolution rate (e.g., 30 seconds per revolution) divided by the separation distance (e.g., as a unit-less divisor), or the temporal speed may be a pre-determined revolution rate (e.g., 2 seconds) multiplied by the separation distance (e.g., as a unit-less multiplier). As such, the user 100 may speed up or slow down the revolution rate by narrowing or broadening the distance between their hands while making the gesture, thereby providing an additional degree of control for the temporal manipulation.

In the example embodiment, stopping the reverse circular motion of the hands causes the temporal manipulation module 210 to enter the idle mode 306. Further, a forward circular motion causes the temporal manipulation module 210 to enter the forward mode 308. Any of the above-described gesture features may be applied to the forward mode 308, the rewind mode 304, or both, and in any combination.

FIG. 4B is a view of the VR environment 400 illustrating example gestures 408A, 408B (collectively, gesture 408, or "the forward gesture" 408) in a forward circular motion, wherein both the left and right handhelds 410 are a small distance from each other and follow the revolution as illustrated. In other words, when the handheld 410 is at the top of the circular path, it is traveling away from the user 100, and when the handheld 410 is at the bottom of the circular path, it is traveling towards the user 100. The speed at which the hands revolve in forward circular motion is linked to the speed at which the virtual actions are forwarded.

In some embodiments, breaking the coplanar positioning of the handhelds 410 may stop the temporal manipulation process. For example, when the user 100 wants to stop rewinding or forwarding the recorded changes, the user 100 may simply move one or both of the handhelds 410 away from the plane of revolution. In some embodiments, the temporal manipulation process may be stopped or started based on a pressed key on the handheld, or based on a voice command through the HMD 102.

Figure 5:
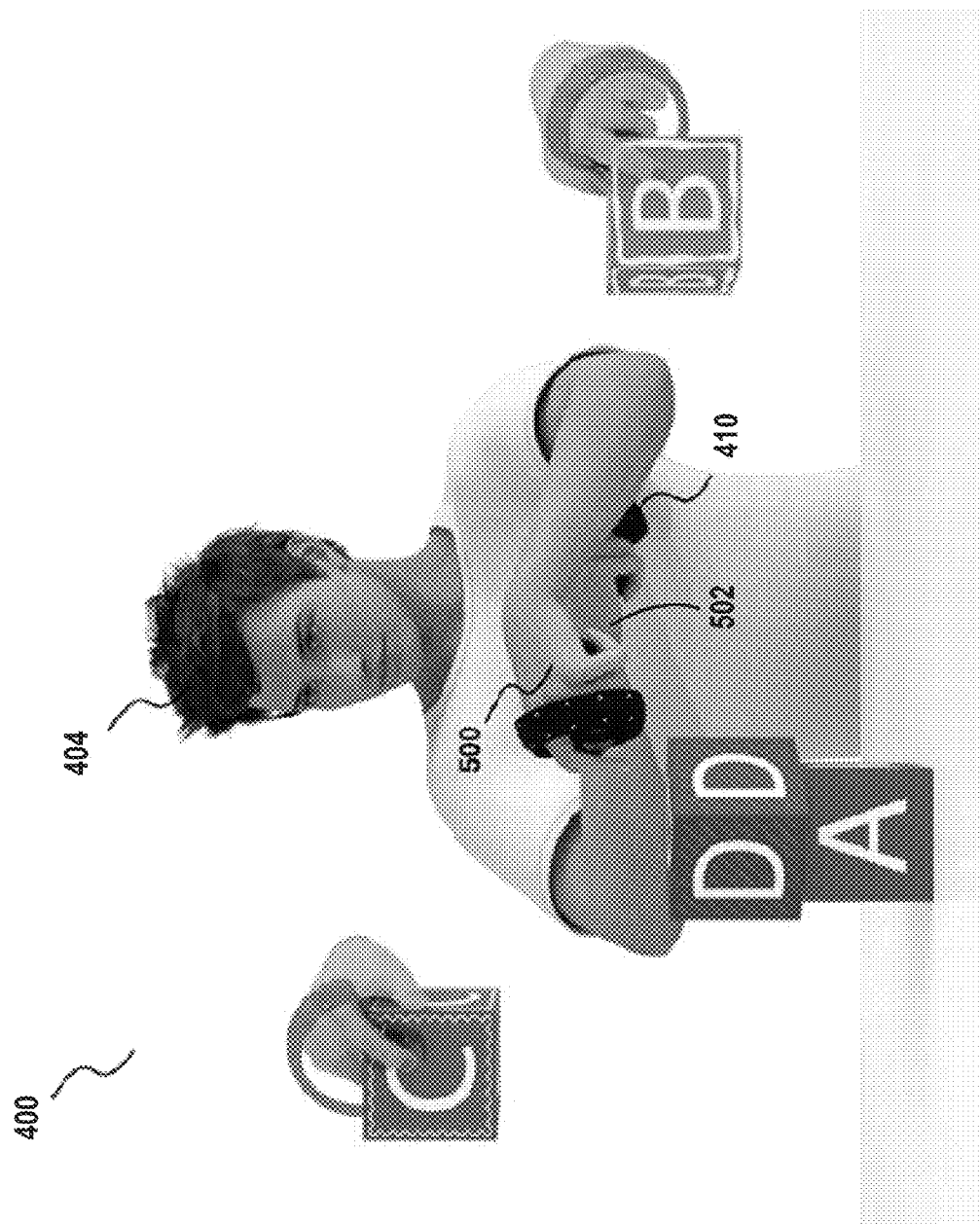
FIG. 5 is a view of the virtual environment illustrating a scenario in which a right hand of the user is behind a left hand of the user, potentially blocking a hand of the user (e.g., the right hand) or one of the handhelds from a tracking sensor (not shown)

FIG. 5 is a view of the VR environment 400 illustrating a scenario in which a right hand 502 of the user 100 is behind a left hand 500 of the user 100, potentially blocking a hand of the user 100 (e.g., the right hand 502) or one of the handhelds 410 from a tracking sensor (not shown). The gestures 402, 408 shown in FIGS. 4A-4B describe the gestures 402, 408 as having the handhelds 410 revolve around each other (e.g., approximately sharing a vertical plane). However, some handheld trackers may lose the tracking of one hand as it goes behind the second hand during each full revolution (e.g. Oculus™ and HTC Vive™), as illustrated in the scenario shown in FIG. 5. To mitigate this problem, in some embodiments, once the temporal manipulation process is initiated (e.g., by the revolving handhelds 410 in the plane of revolution), the temporal manipulation module 210 may allow an amount of deviation of the handhelds 410 from the plane of revolution. For example, an initial coplanar deviation of the handhelds 410 for the handhelds 410 to be considered coplanar may be within 1 inch. Once initiated, the temporal manipulation module 210 may relax the coplanar deviation of the handhelds 410 to a higher value, such as 4 inches (e.g., before the separation of the handhelds 410 results in termination of the temporal manipulation process.

In other embodiments, in order to mitigate this occlusion tracking problem, for example, the gestures 402, 408 may be implemented using finger gestures such that the handhelds 410 minimize occlusion as the arms revolve around each other, thereby allowing the gestures 402, 408 to be performed with the handhelds 410 separated by a greater distance.

Figure 6:
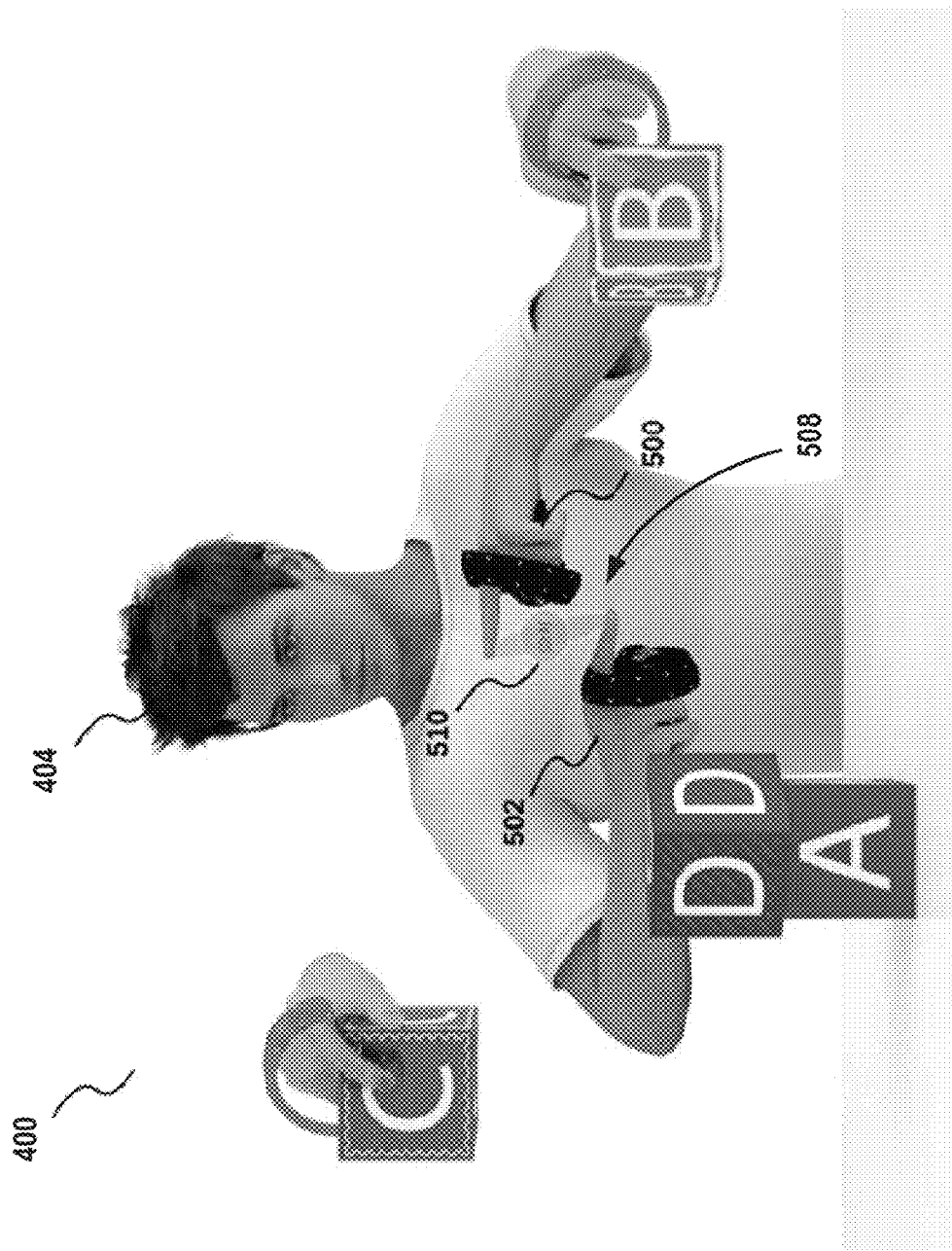
FIG. 6 is a view of the virtual environment illustrating a finger gesture which, when detected by the temporal manipulation module, initiates the rewind mode during the temporal manipulation process.

FIG. 6 is a view of the virtual environment 400 illustrating a finger gesture 508 which, when detected by the temporal manipulation module 210, initiates the rewind mode 304 during the temporal manipulation process. The finger gesture 508 may be similar to the rewind gesture 402 or the forward gesture 408, but may be detected based on a two finger gesture whereby two fingers (e.g., one from each hand 500, 502) are revolved such that each finger revolves around the other in a circular motion. Like the rewind gesture 402, reverse circular motion of the fingers in the gesture 508 cause the rewinding of the virtual actions, and forward circular motion of the fingers in gesture 508 cause the forwarding of the virtual actions.

Further, the speed at which the fingers revolve in reverse circular motion is linked to the speed at which the virtual actions are rewound. Stopping the reverse circular motion causes the temporal manipulation module 210 to enter idle mode 306. A forward circular motion causes the temporal manipulation module 210 to enter the forward mode 308. Like the revolutions described above with regard to gestures 402 and 408, the speed at which the fingers revolve in forward circular motion may be linked to the speed at which the virtual actions are forwarded. As such, FIG. 6 illustrates that the left hand 500 and the right hand 502 no longer occlude each other as they perform the circular motion of the gesture 508. In other words, the handhelds 410 may no longer be vertically coplanar with the finger gestures 508, but instead, the fingertips of the hands 500, 502 may be vertically coplanar.

In some embodiments, the space between the fingers (e.g., in the VR environment 400, as shown in FIG. 6), or the space between the handhelds 410, may be used as a display area 510 to display information for the user 100 while in the rewind mode 304 or forward mode 308. The display area 510 may, for example, be used to display information such as the recording time (e.g., identifying the current point in time within the content).

In some embodiments, the occlusion problem described above may be mitigated using an approximation technique within the temporal manipulation module 210. The movements of the handhelds 410 may be linear and predictable and, as such, the temporal manipulation module 210 may calculate an estimate for the position and direction of motion of an occluded handheld 410 based on, for example, the last known position and direction of motion of the device and the position and direction of motion of the second (e.g., non-occluded) handheld device, or based on just the movement of the visible handheld 410. The temporal manipulation module 210 may use the approximated path, position, or direction of the occluded handheld (e.g., in the absence of sensed data), in combination with the known position and direction of the non-occluded handheld, to detect whether the user 100 has made any of the gestures 402, 408, 508.

Figure 7A:
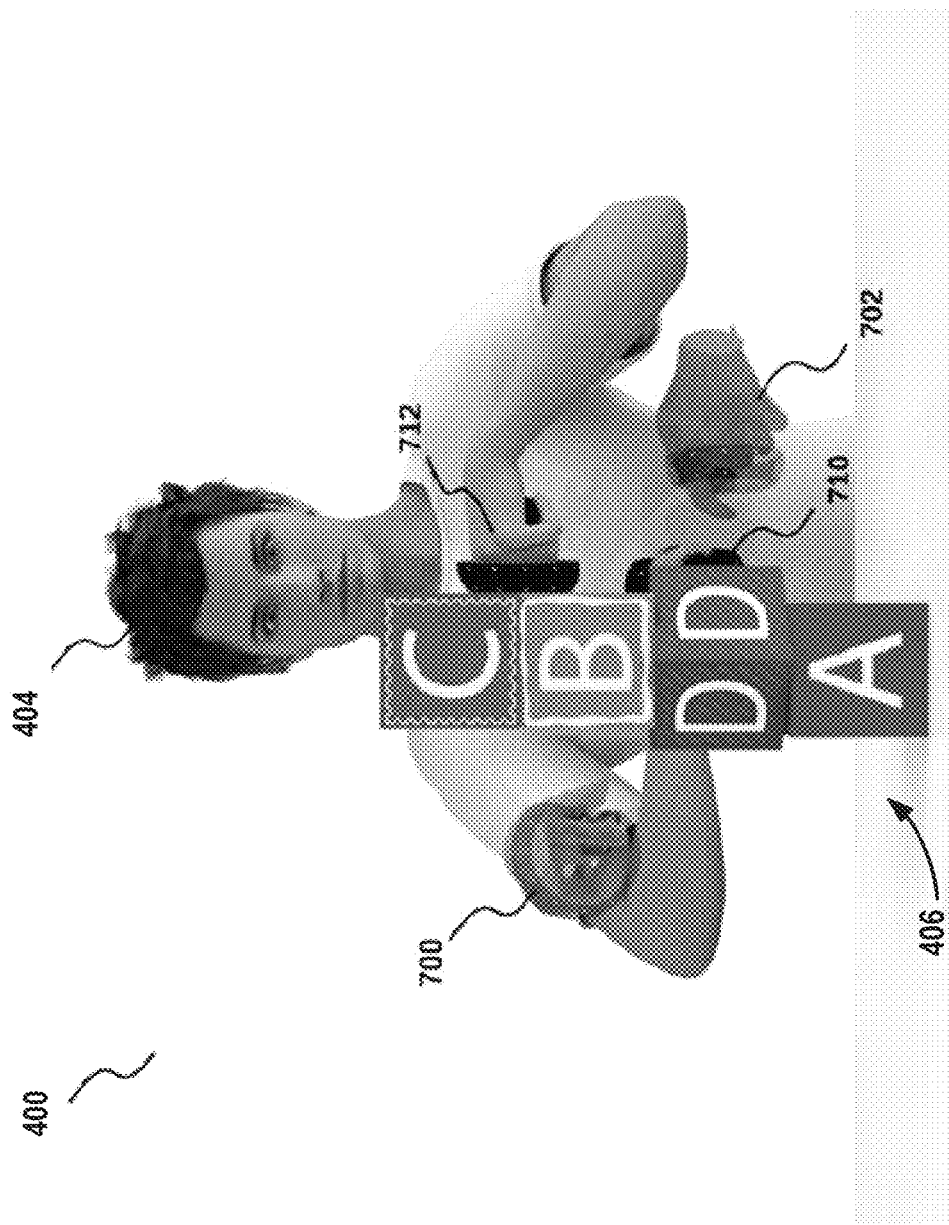
FIGS. 7A and 7B are example views of the VR environment in which the temporal manipulation module displays disembodied virtual hands during the temporal manipulation process.
Figure 7B:
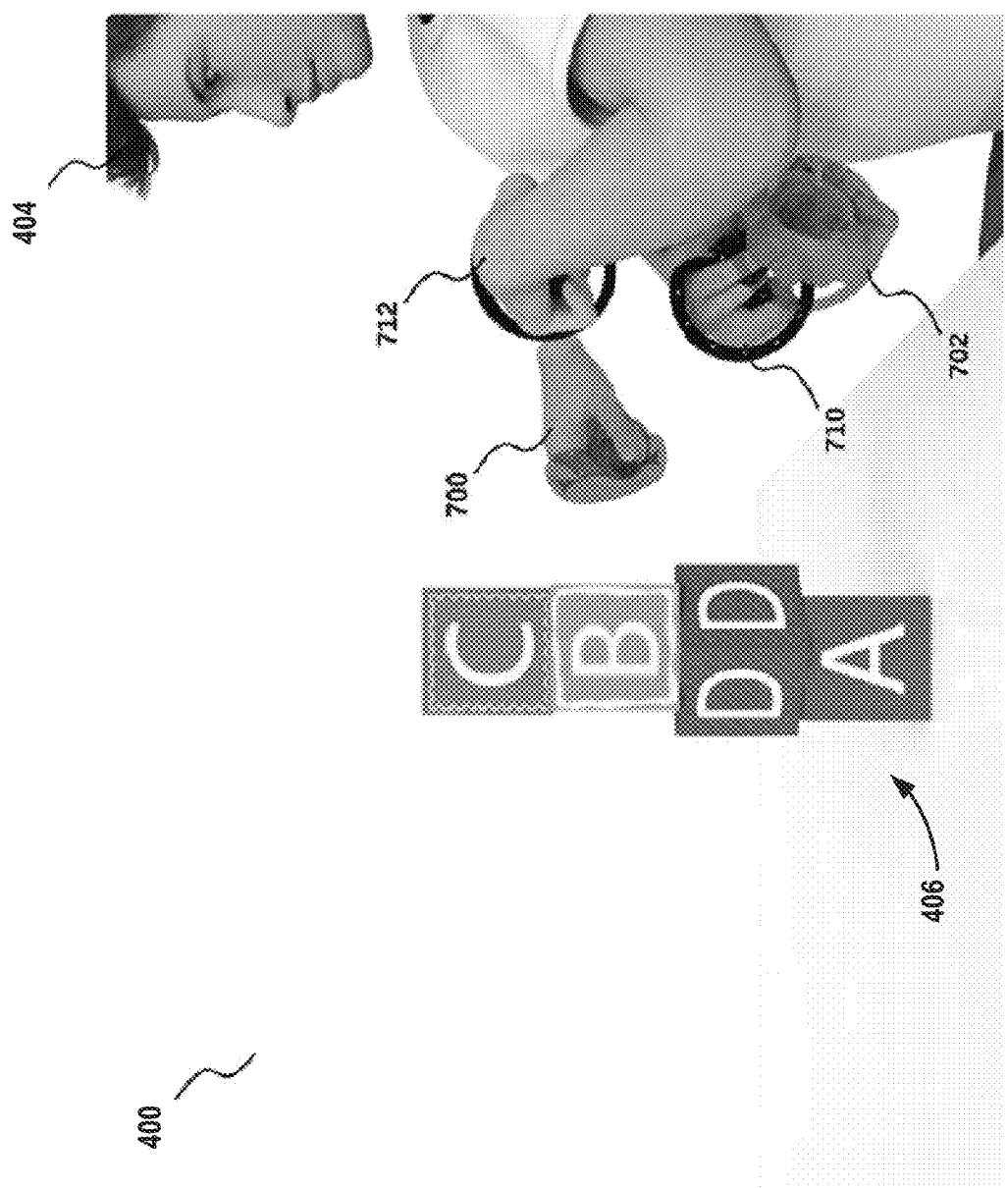

FIGS. 7A and 7B are example views of the VR environment 400 in which the temporal manipulation module 210 displays disembodied virtual hands 700, 702 during the temporal manipulation process. As the user 100 performs the temporal manipulation process (e.g., rewinding, forwarding through recorded changes to the VR environment 400), the temporal manipulation module 210 displays the environmental changes performed by the user 100, as described herein. In some embodiments, in addition to showing the virtual objects as they appear and change in the environment 400, the temporal manipulation module 210 may additionally, or alternatively, display disembodied virtual hands 700, 702 of the user 100 (e.g., when not in record mode 302) at the point in time of the recording, and may move the disembodied virtual hands 700, 702 as the user 100 rewinds or forwards the recording.

In the example embodiment, the disembodied virtual hands 700, 702 appear as ghosted images of hands of the user 100. The virtual hands 700, 702 serve to visually depict, to the user 100, where the hands 710, 712 of the user 100 were at the particular point in time of the recording. More specifically, the disembodied virtual hand 700 represents the right hand 710 of the user 100 and the disembodied virtual hand 702 represents the left hand 712 of the user 100.

During rewind mode 304 and forward mode 308, and as the hands 710, 712 of the user 100 are performing the temporal manipulation gestures, the temporal manipulation module 210 displays the disembodied virtual hands 700, 702 such as to replay all the virtual actions in reverse chronological order or forward chronological order, respectively (e.g., moving around within the VR environment 400, interacting with blocks 406). In some embodiments, the temporal manipulation module 210 records positioning, orientation, and action data associated with the hands 710, 712 of the user 100 (e.g., via the handhelds 410 or other hand tracking devices) to determine where the hands 710, 712 of the user 100 were at any given point in time during the recording.

FIGS. 8A-8D illustrate an example series of actions (e.g., repositioning tasks) performed by the user 100 within the VR environment 400. In the example embodiment, the temporal manipulation module 210 records the actions of the user 100 (e.g., while in the record mode 302) as the user 100 is positioning four virtual blocks 802, 804, 806, 808, one on top of the other within the VR environment 400.

Figure 8A:
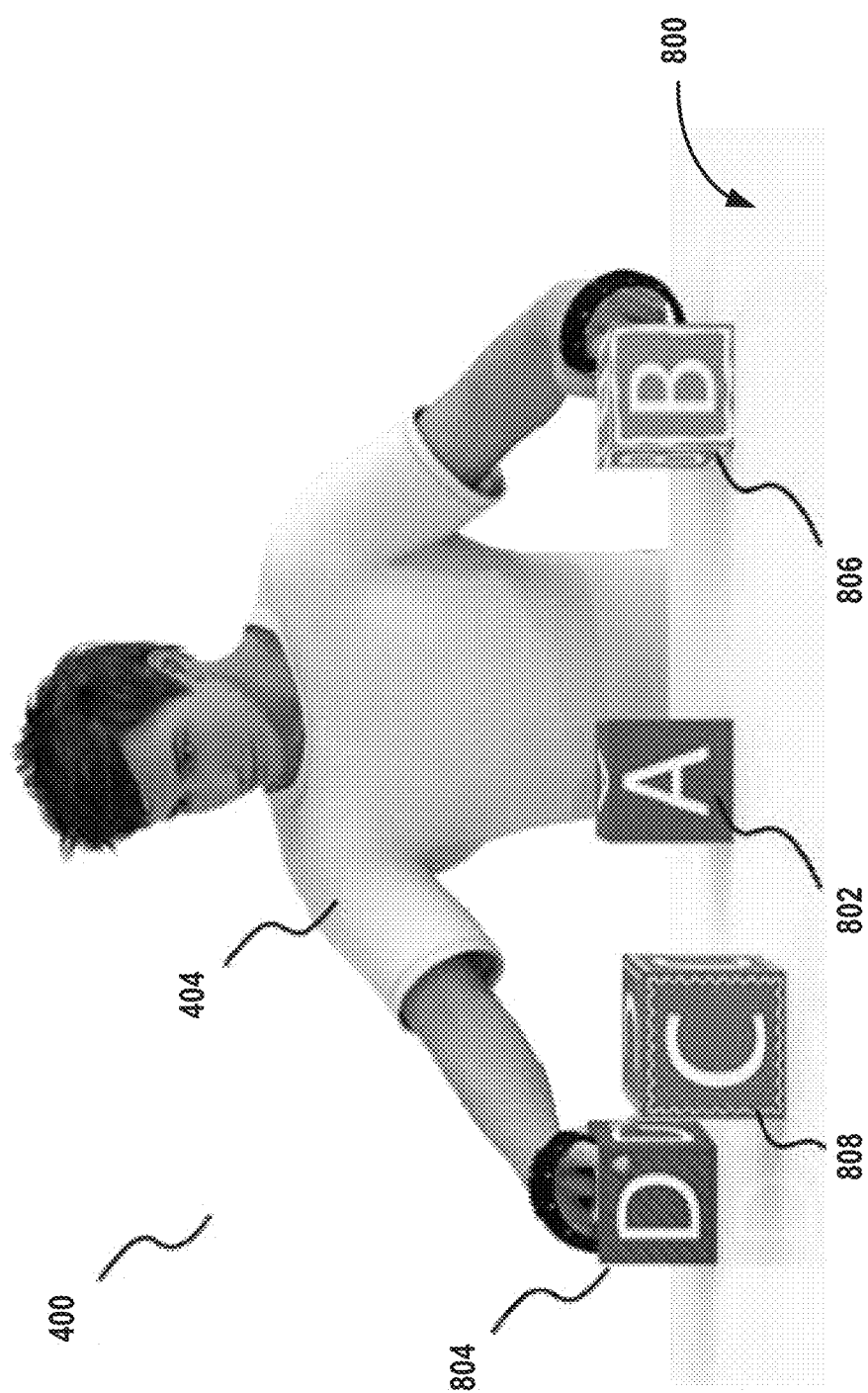
FIGS. 8A-8D illustrate an example series of actions (e.g., repositioning tasks) performed by the user within the virtual environment.
Figure 8B:
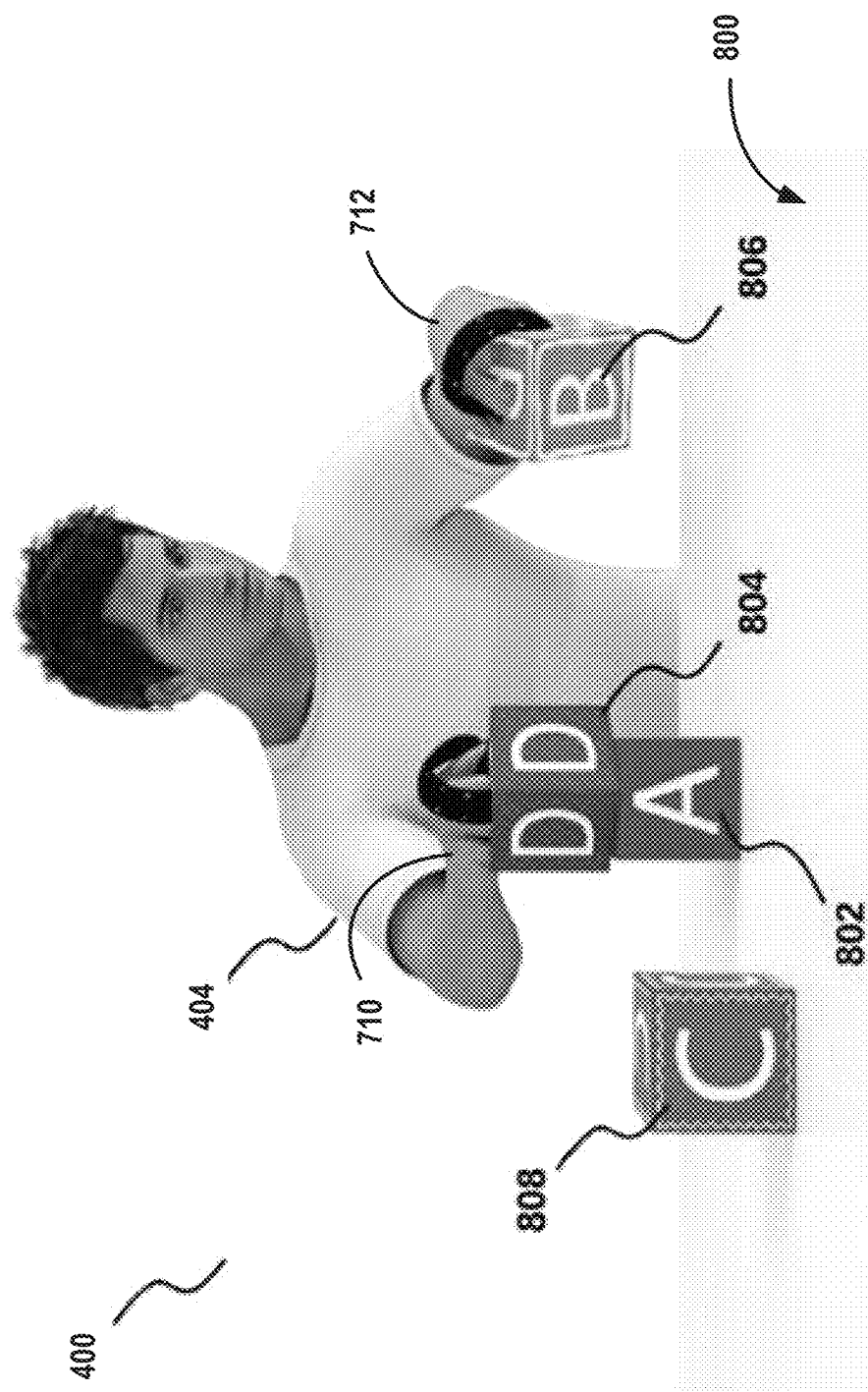
Figure 8C:
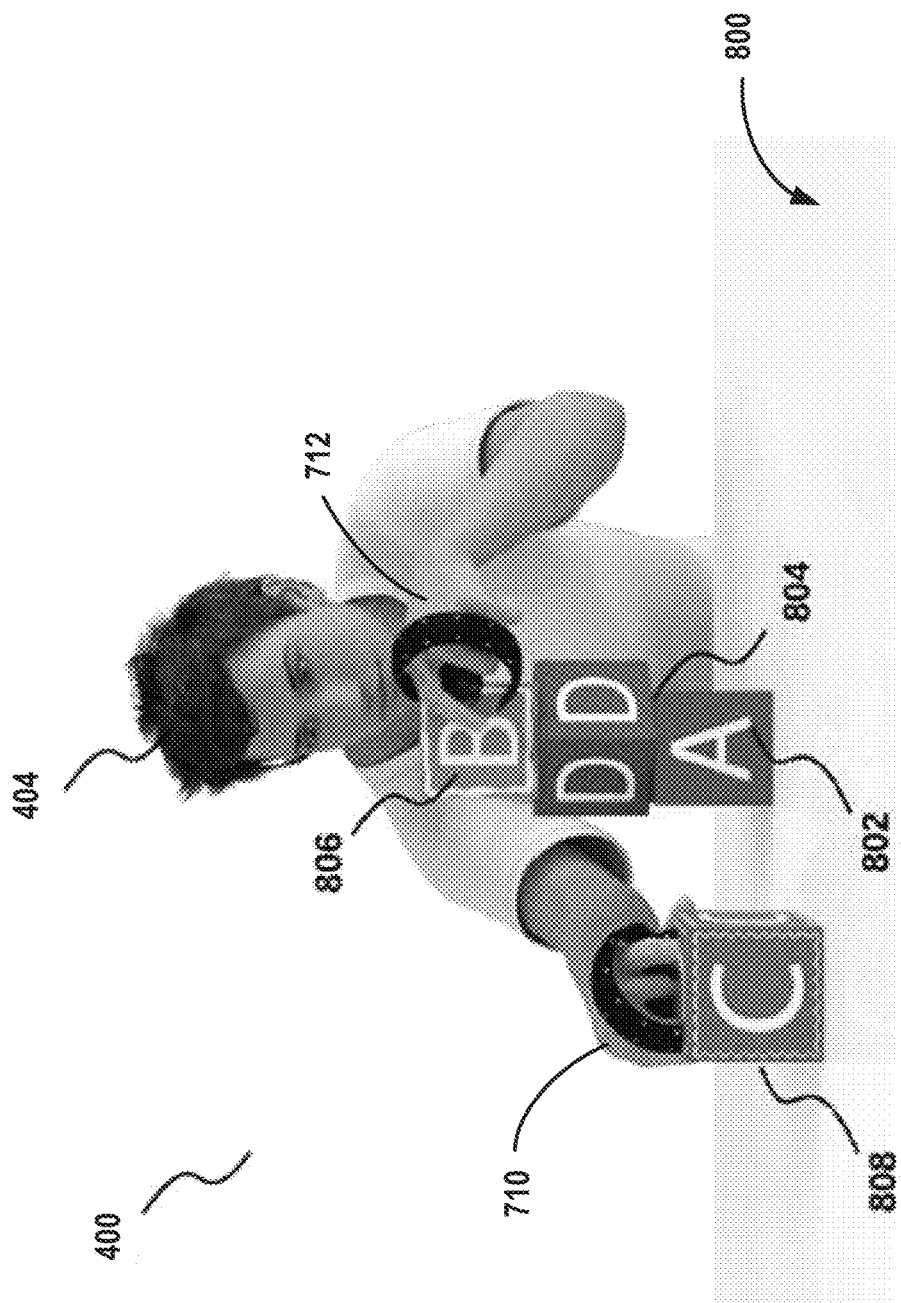
Figure 8D:
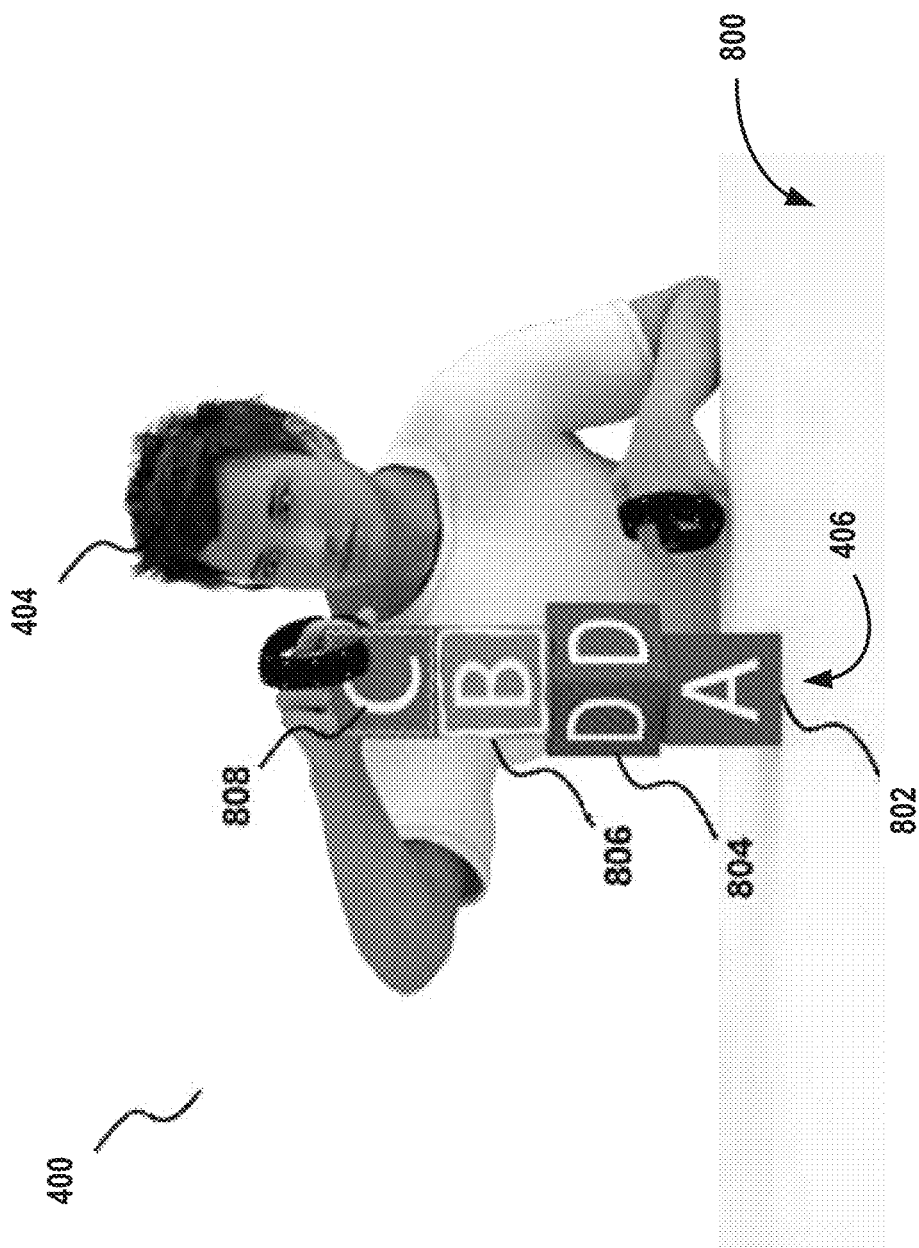

In the example shown in FIG. 8A, at a first point in time, the four blocks 802, 804, 806, 808 are on a virtual table 800. The blocks 802-808 are labeled block 'A' 802, block 'B' 806, block 'C' 808 and block 'D' 804. Block 'A' 802 is directly in front of the user 100. As shown in FIG. 8B, the user 100 takes block 'D' 804 with their right hand 710 and places block 'D' 804 on top of block 'A' 802 while, at the same time, the user 100 starts to pick up block 'B' 806 with their left hand 712. As shown in FIG. 8C, the user 100 places block 'B' 806 on top of block 'D' 804 while at the same time beginning to pick up block 'C' 808 with their right hand 710. In FIG. 8D, the user 100 places block 'C' 808 on top of block 'B' 806 to complete the stack of blocks.

Figure 9A:
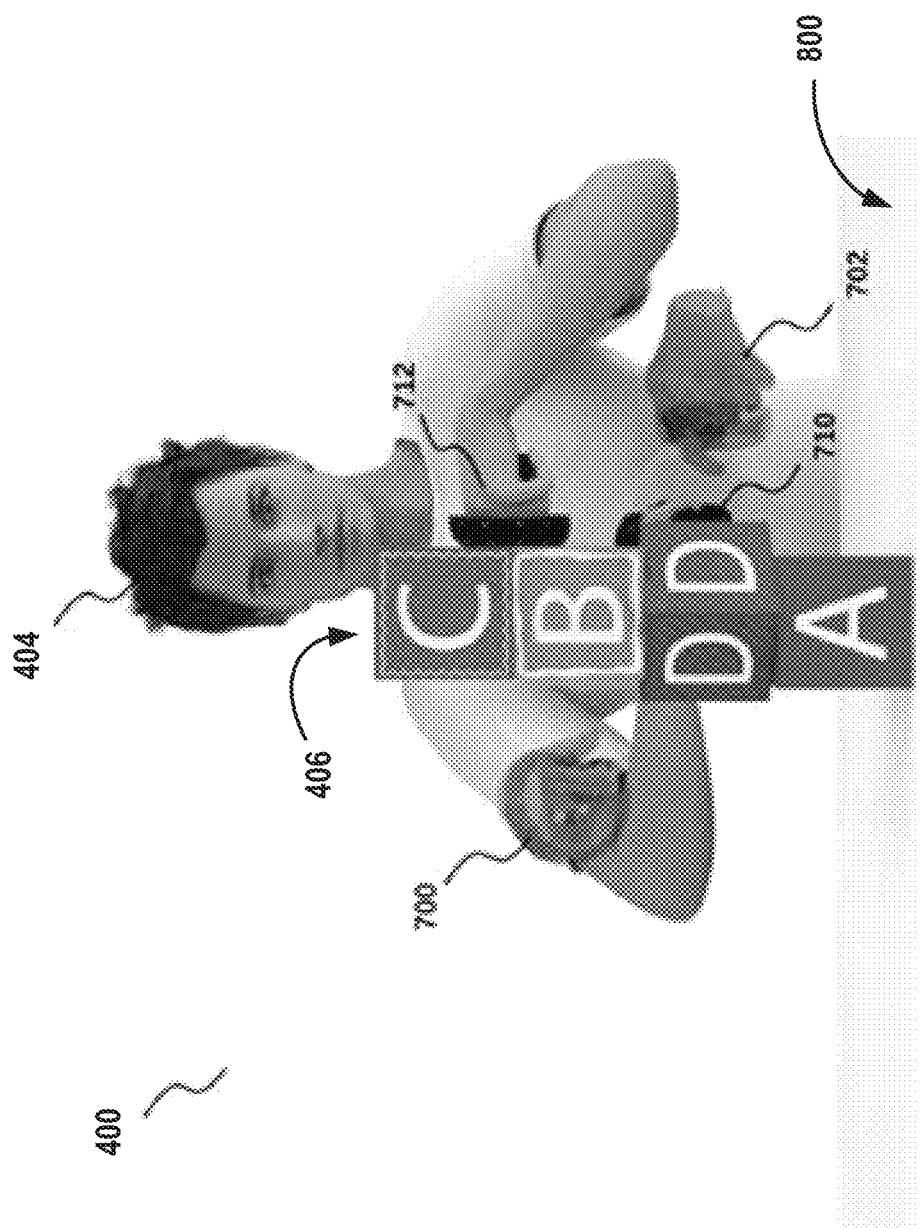
FIGS. 9A-9C illustrate an example temporal manipulation process in which the user rewinds some of the actions recorded during the stacking process shown and described above in reference to FIGS. 8A-8D.
Figure 9B:
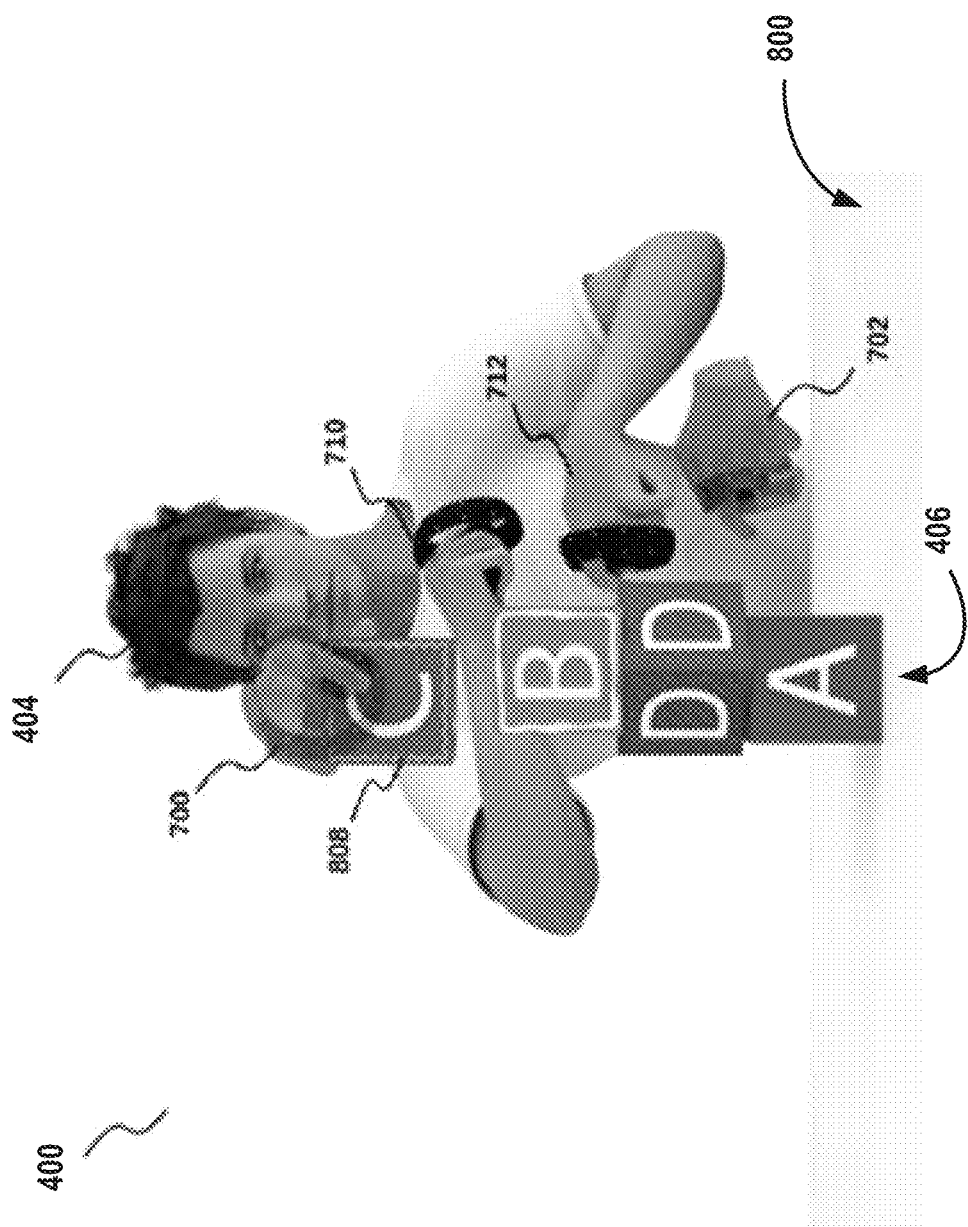
Figure 9C:
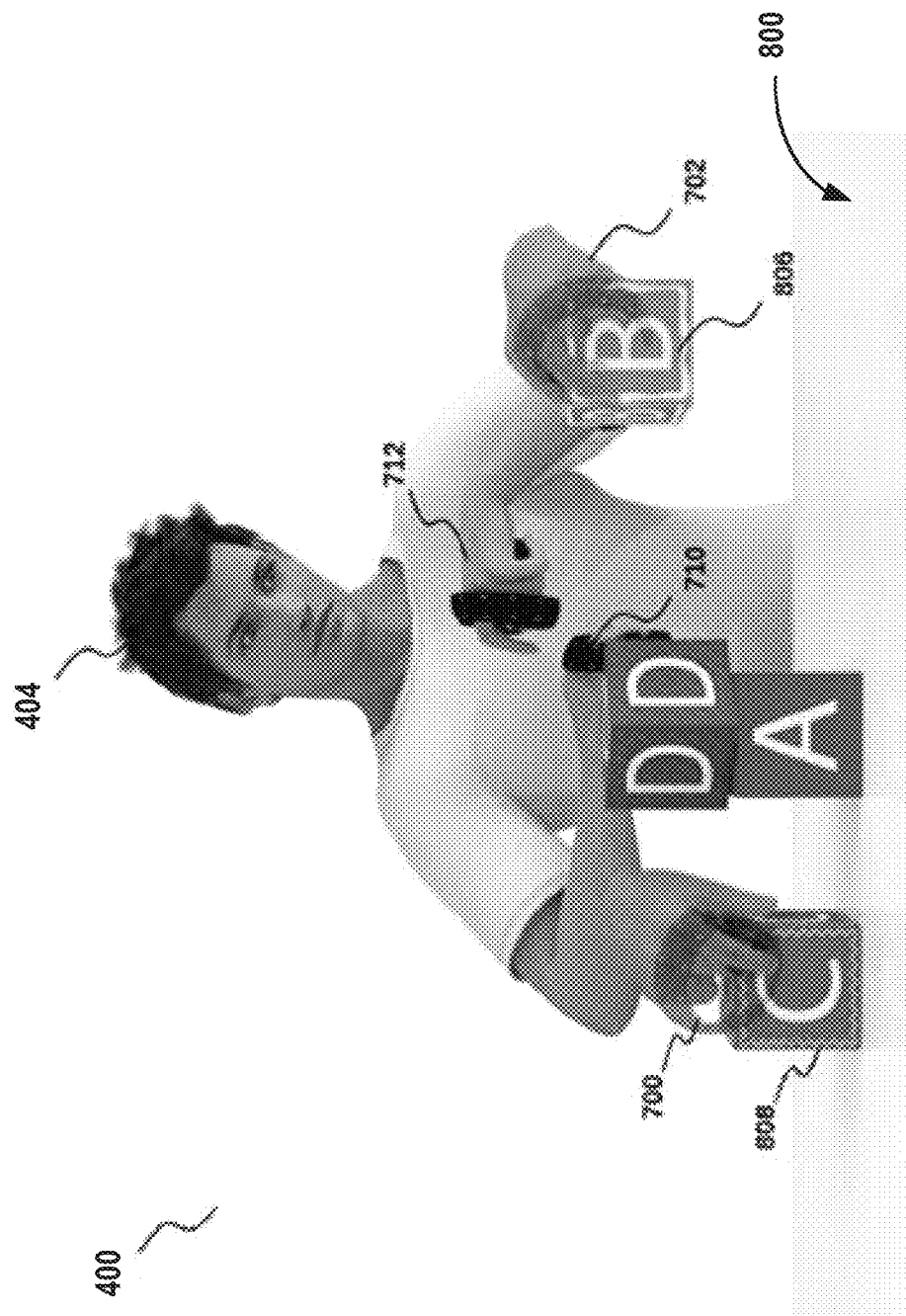

FIGS. 9A-9C illustrate an example temporal manipulation process in which the user 100 rewinds some of the actions recorded during the stacking process shown and described above in reference to FIGS. 8A-8D. In the example embodiment, after the blocks 802, 804, 806, 808 are stacked, the user 100 aligns their hands 710, 712 (e.g., and the handhelds 410) in front of themselves and performs the rewind gesture 402 to enter the rewind mode 304. As such, in the example embodiment, the temporal manipulation module 210 displays the disembodied virtual hands 700, 702 and begins to perform the recorded actions in reverse chronological order, mimicking the original position and motion of the hands 710, 712 of the user 100 as they had performed the actions during the record mode 302 (e.g., as shown in FIGS. 8A-8D).

In some embodiments, the user 100 views the rewinding and forwarding process from a first-person perspective based on their position during the recorded session. In some embodiments, the user 100 may view the rewinding and forwarding process from a disembodied third-person perspective (e.g., allowing the user 100 to change the viewing position and orientation within the virtual environment 400 as they wish). For example, during the temporal manipulation process, the user 100 may walk around a target object within the virtual environment 400 to inspect that virtual object from a different perspective.

FIG. 9A illustrates the user 100 performing the reverse circular motion (e.g., starting the rewind gesture 402) with his hands 710, 712 to enter rewind mode 304 after the stack of blocks 406 is complete. As rewind mode 304 begins, the disembodied virtual hands 700, 702 appear. As shown in FIG. 9B and FIG. 9C, the user 100 continues with the reverse circular motion (e.g., continuing the rewind gesture 402), thereby causing the disembodied virtual right hand 700 to take block 'C' 808 from the stack of blocks 406 and place block 'C' 808 back on the table 800, and thereby mimicking, in reverse sequence, the motions of the user 100 described above in relation to FIG. 8C. Also, as shown in FIG. 9C, the user 100 continues to perform the reverse circular motion, and the disembodied virtual left hand 702 takes block 'B' 806 from the stack and starts to move it back towards the table 800, thereby mimicking, in reverse sequence, the motions of the user 100 described above in reference to FIGS. 8B and 8C.

Figure 10:
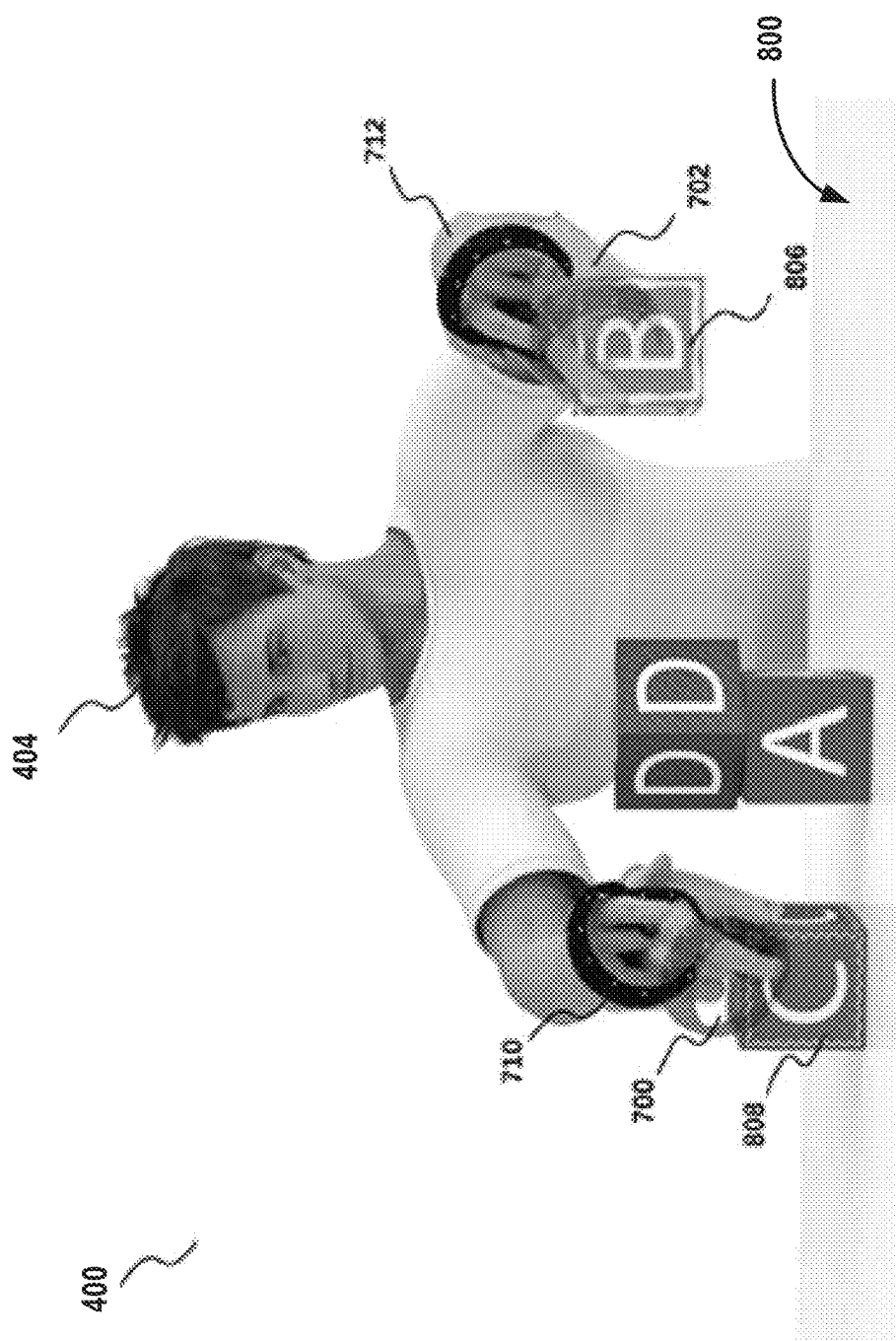
FIG. 10 is a view of the virtual environment in which the user exits rewind mode into idle mode by halting the example rewind gesture described above in reference to FIGS. 9A-9C.

FIG. 10 is a view of the VR environment 400 in which the user 100 exits rewind mode 304 into idle mode 306 by halting the example rewind gesture 402 described above in reference to FIGS. 9A-9C. In the example embodiment, the user 100 re-enters record mode 302 by positioning their hands 710, 712 in approximate alignment with their respective virtual hands 700, 702. In some embodiments, the user 100 may terminate a current temporal manipulation process or enter record mode 302 using a voice command (e.g., via the HMD 102), or through pressing a button (e.g., via the handheld 410).

For example, presume that the user 100 is rewinding actions using the rewind gesture 402, and the user 100 reaches a moment where they would like to resume creation, thereby having undone certain actions (e.g., any actions after the idle time). When the hands 710, 712 stop the reverse revolution gesture, the temporal manipulation module 210 enters idle mode 306 where the rewinding of actions has stopped, and the virtual hands 700, 702 are paused in mid action (e.g. as shown in FIG. 9C where block 'B' 806 is in mid air above the table 800). The user 100 may then position their hands 710, 712 approximately into (e.g., within a pre-determined distance, and optionally alignment of) the paused disembodied virtual hands 700, 702 to re-enter record mode 302. It should be understood that the hands 710, 712 of the user 100 are illustrated slightly above the disembodied hands 700, 702 in FIG. 10 for purposes of distinguishing between the two. This "resuming posture action" of the hands 710, 712 with the virtual hands 700, 702 causes the temporal manipulation module 210 to transition from idle mode 306 back into record mode 302, thereby resuming the creation process, and thereby undoing any actions past the idle time. As such, the user 100 has "rewound" to a particular point in the recorded actions and is able to resume at a specific time.

In some embodiments, the virtual hands 700, 702 may be displayed in a form visually distinguishing the virtual hands 700, 702 from the hands 710, 712. For example, the virtual hands 700, 702 may be a different color than the hands 710, 712, or the virtual hands 700, 702 may be displayed as a mesh and the hands 710, 712 as solid, or the virtual hands 700, 702 may glow while the hands 710, 712 do not.

In some embodiments, the recorded sessions may be packaged and exported as playable virtual movies (e.g., for use as tutorials), and the temporal manipulation module 210 may similarly be used to control the flow of the session during playback viewing.

In some embodiments, the user 100 may replay a previously recorded session through the temporal manipulation module 210 (e.g., as if watching a movie of themselves working). For example, the user 100 may enter the VR engine 212 and replay the last 30 minutes of their actions from the previously recorded session in order to review their past actions. In some embodiments, the recorded session may be saved in a networked location (e.g., cloud-based storage), and can be accessed from different geographical locations in a collaborative way (e.g., between multiple users 100). As such, a session recorded by a first user 100 in a first geographical location can be accessed and watched by a second user 100 in a second geographical location.

Many of the examples described herein, including those examples described in reference to FIGS. 4-10, are described as being performed in a full virtual environment (e.g., the VR environment 400). Those embodiments are referred to herein as "VR embodiments". In some embodiments, the temporal manipulation module 210 may provide some or all of the temporal manipulation process functionality described herein in a mixed reality setting. These embodiments are referred to herein as "MR embodiments". In MR embodiments, the user 100 simultaneously experiences both a real world environment and a virtual environment. As such, some parts of the temporal manipulation process may differ. In MR embodiments, a virtual environment similar to the VR environment 400 may be provided.

For example, the HMD 102 may include a transparent or semi-transparent visor 108, and the VR engine 212 may be configured to display virtual content (e.g., virtual objects) in conjunction with the real-world view the user 100 experiences via the HMD 102. The HMD 102 may track the real-world position of real-world objects in the environment around the user, the HMD 102, the user 100, or the body of the user 100 (e.g., hands, head, full body, and so forth). The VR engine 212 may use the real-world location of real-world objects in conjunction with displaying virtual objects. For example, the table 800 shown in FIGS. 8A-10 may be a real-world table identified by the HMD 102, and the blocks 406 may be virtual objects with which the user 100 interacts (e.g., as described in those examples). In some MR embodiments, the user 100 may use handhelds 410 as described above. In other MR embodiments, the HMD 102 may track the position of the hands of the user 100 without the use of handhelds (e.g., via position tracking sensors, image recognition, and so forth).

As such, in some MR embodiments, as a part of the temporal manipulation process, the temporal manipulation module 210 may record real-world position data associated with real-world objects, the HMD 102, or the user 100 and associated body parts. Like the real-world data associated with the handhelds 410, this MR real-world data may be recorded in its original form, or translated into position data relative to the virtual environment and recorded in its "virtual environment" form. During a rewind or forward process, the temporal manipulation module 210 may then use the recorded MR real-world data, as well as the associated virtual data, to rewind or forward through actions made by the user 100.

For example, presume that the example shown and described in relation to FIGS. 8A-10, instead of being in a full VR environment 400, is instead in an MR environment where the table 800 is a real-world table, the blocks 802-808 are virtual objects, and the user 100 is stacking the virtual blocks 802-808 on the real-world table 800. And like the original example, during the record process, the user 100 stacks the blocks 802-808 on the real-world table 800 as shown in FIGS. 8A-8D. Further, in this MR example, the avatar 404 shown in the FIGS. 8A-10 is instead the real-world body of the user 100 as they manipulate virtual blocks 802-808 on a real-world table 800. In some embodiments, the user 100 may use handhelds 410 as shown. In some embodiments, the hand, body, head of the user 100 may be tracked by other methods (e.g., as described above).

As such, and continuing this MR example, in addition to recording the virtual data associated with the user 100's actions, the temporal manipulation module 210 may also record real-world data as the user 100 manipulates the blocks 802-808. For example, the POM of the real-world hands of the user 100, the head 104 of the user 100, point cloud data of the hands or whole body of the user 100, and the table 800 may be recorded. During the rewind mode 304 or forward mode 308, the temporal manipulation module 210 replays the recorded actions of the use 100, and may additionally use the recorded real-world data as well. For example, the recorded real-world data may be used to identify the relative location of virtual objects to real-world objects, or the relative position of motion of the user 100 to real-world or virtual objects, or to project a virtual image of the user 100 based on where the user 100 was at the recorded time. In other words, while no avatar 404 was displayed during the record mode 302 (e.g., because the user 100's own body was the avatar), the temporal manipulation module 210 may display aspects of the virtual avatar 304, such as virtual hands, head, or full body of the user 100 representing where they were during the rewind mode 304 or forward mode 308 such that the user 100 can see not only the other virtual objects and what happens to them, but also where the user 100 was during the recorded actions. As such, from a third-person perspective, the user 100 may be able to view a virtual representation of themselves taking actions within the MR environment.

Figure 11:
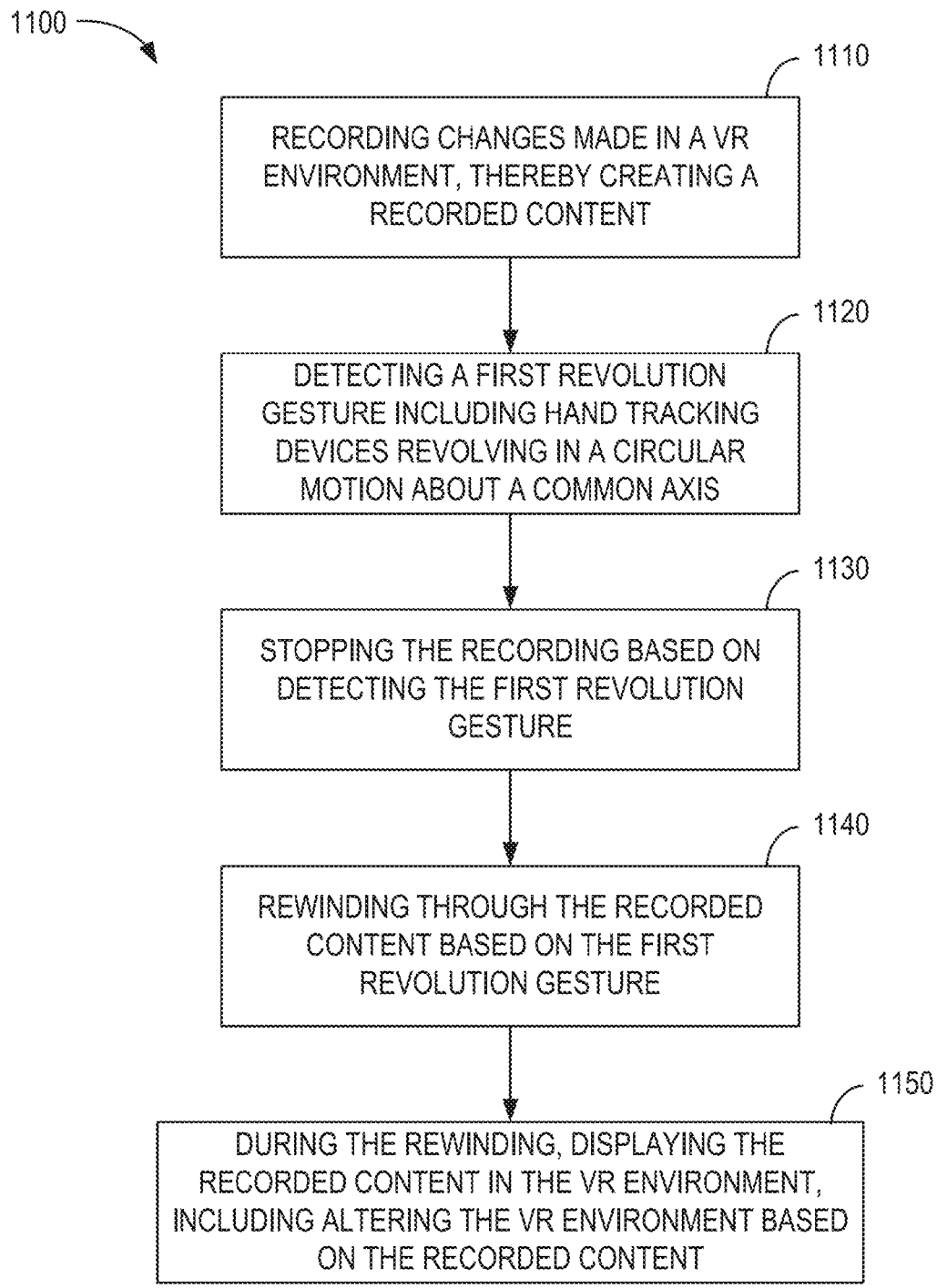
FIG. 11 is a flowchart of an example computer-implemented method for providing temporal manipulation in a virtual environment.

FIG. 11 is a flowchart of an example computer-implemented method 1100 for providing temporal manipulation in a virtual environment. The computer-implemented method 1100, hereafter referred to as "the method 1100," is performed by a computing device comprising at least one hardware processor and a memory. In the example embodiment, the method 1100 includes recording changes made in a virtual reality (VR) environment involving a user, thereby creating a recorded content (see operation 1110).

The method 1100 also includes detecting a first revolution gesture performed by the user with a first and a second hand tracking device, the first and second hand tracking devices being configured to provide position information associated with a first and a second hand of the user, the first revolution gesture including the first and second hand tracking devices revolving in a circular motion about a common axis (see operation 1120). In some embodiments, detecting the first revolution gesture further includes determining that the first and second hand tracking devices are approximately vertically coplanar, wherein the first and second hand tracking devices revolve about each other. In some embodiments, detecting the first revolution gesture further includes determining that a first finger of a left hand of the user and a second finger of a right hand of the user are approximately vertically coplanar, wherein the first and second fingers revolve about each other.

The method 1100 further includes stopping the recording based on said detecting of the first revolution gesture (see operation 1130). The method 1100 also includes rewinding through the recorded content based on the first revolution gesture (see operation 1140). In some embodiments, rewinding through the recorded content based on the first revolution gesture further includes rewinding through the recorded content at a temporal speed based on a separation distance between the first and the second hand tracking devices. In some embodiments, the method 1100 further includes, during the rewinding, detecting a change in the separation distance between the first and the second hand tracking devices, and altering the temporal speed based on the change in the separation distance.

The method 1100 also includes, during the rewinding, displaying the recorded content in the VR environment, the displaying including altering the VR environment based on the recorded content (see operation 1150).

In some embodiments, the method 1100 also includes, during the rewinding, detecting a second revolution gesture performed by the user with the first and second hand tracking devices, the second revolution gesture including the first and second hand tracking devices revolving in a circular motion opposite of the first revolution gesture, based on the detection of the second revolution gesture, forwarding through the recorded content, and displaying the recorded content in the VR environment during the forwarding. In some embodiments, the recording, the rewinding, and the displaying are a part of a first temporal manipulation process, and the method 1100 further includes detecting a temporal manipulation termination event at a point in time within the recorded content, and terminating the first temporal manipulation process, thereby allowing the user to resume direct interaction with the VR environment.

Certain embodiments are described herein as including logic or a number of components, modules, or mechanisms. Modules may constitute either software modules (e.g., code embodied on a machine-readable medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or with any suitable combination thereof. For example, a hardware module may include dedicated circuitry or logic that is permanently configured to perform certain operations. For example, a hardware module may be a special-purpose processor, such as a field-programmable gate array (FPGA) or an Application Specific Integrated Circuit (ASIC). A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software may accordingly configure a particular processor or processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, with a particular processor or processors being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain of the operations may be distributed among the processors, not only residing within a single machine, but deployed across a number of machines.

In some example embodiments, the processors or processor-implemented modules may be located in a single geographic location (e.g., within a home environment, an office environment, or a server farm). In other example embodiments, the processors or processor-implemented modules may be distributed across a number of geographic locations.

Figure 12:
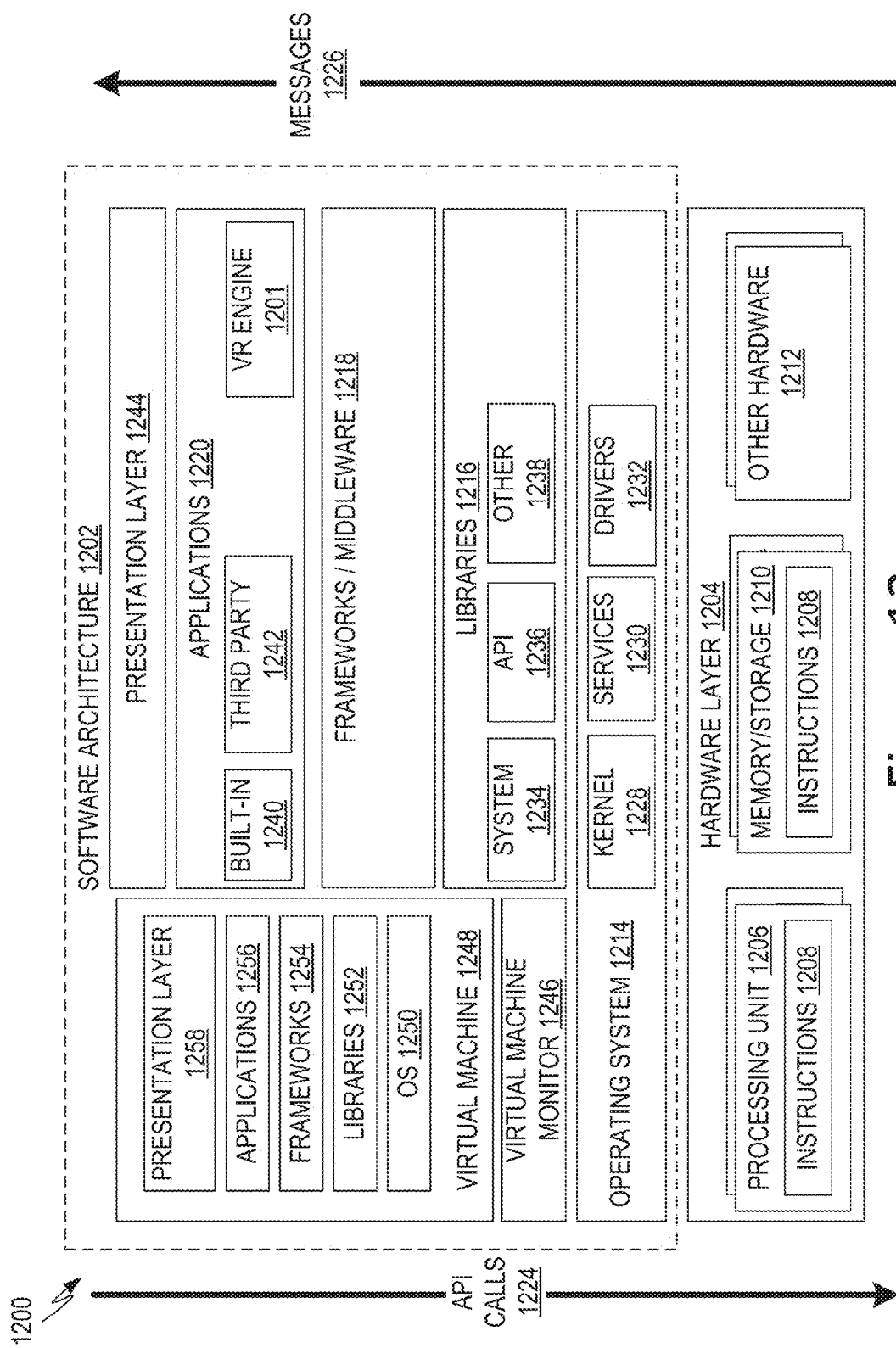
FIG. 12 is a block diagram illustrating an example software architecture, which may be used in conjunction with various hardware architectures herein described to provide a VR engine, which may be similar to the VR engine shown in FIG. 2.

FIG. 12 is a block diagram 1200 illustrating an example software architecture 1202, which may be used in conjunction with various hardware architectures herein described to provide a VR engine 1201, which may be similar to the VR engine 212 as described above. FIG. 12 is a non-limiting example of a software architecture and it will be appreciated that many other architectures may be implemented to facilitate the functionality described herein. The software architecture 1202 may execute on hardware such as a machine 1300 of FIG. 13 that includes, among other things, processors 1310, memory 1330, and input/output (I/O) components 1350. A representative hardware layer 1204 is illustrated and can represent, for example, the machine 1300 of FIG. 13. The representative hardware layer 1204 includes a processing unit 1206 having associated executable instructions 1208. The executable instructions 1208 represent the executable instructions of the software architecture 1202, including implementation of the methods, modules and so forth described herein. The hardware layer 1204 also includes memory/storage 1210, which also includes the executable instructions 1208. The hardware layer 1204 may also comprise other hardware 1212.

In the example architecture of FIG. 12, the software architecture 1202 may be conceptualized as a stack of layers where each layer provides particular functionality. For example, the software architecture 1202 may include layers such as an operating system 1214, libraries 1216, frameworks or middleware 1218, applications 1220 and a presentation layer 1244. Operationally, the applications 1220 and/or other components within the layers may invoke application programming interface (API) calls 1224 through the software stack and receive a response as messages 1226. The layers illustrated are representative in nature and not all software architectures have all layers. For example, some mobile or special purpose operating systems may not provide the frameworks/middleware 1218, while others may provide such a layer. Other software architectures may include additional or different layers.

The operating system 1214 may manage hardware resources and provide common services. The operating system 1214 may include, for example, a kernel 1228, services 1230, and drivers 1232. The kernel 1228 may act as an abstraction layer between the hardware and the other software layers. For example, the kernel 1228 may be responsible for memory management, processor management (e.g., scheduling), component management, networking, security settings, and so on. The services 1230 may provide other common services for the other software layers. The drivers 1232 may be responsible for controlling or interfacing with the underlying hardware. For instance, the drivers 1232 may include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 1216 may provide a common infrastructure that may be used by the applications 1220 and/or other components and/or layers. The libraries 1216 typically provide functionality that allows other software modules to perform tasks in an easier fashion than to interface directly with the underlying operating system 1214 functionality (e.g., kernel 1228, services 1230 and/or drivers 1232). The libraries 1216 may include system libraries 1234 (e.g., C standard library) that may provide functions such as memory allocation functions, string manipulation functions, mathematic functions, and the like. In addition, the libraries 1216 may include API libraries 1236 such as media libraries (e.g., libraries to support presentation and manipulation of various media format such as MPEG4, H.264, MP3, AAC, AMR, JPG, PNG), graphics libraries (e.g., an OpenGL framework that may be used to render 2D and 3D graphic content on a display), database libraries (e.g., SQLite that may provide various relational database functions), web libraries (e.g., WebKit that may provide web browsing functionality), and the like. The libraries 1216 may also include a wide variety of other libraries 1238 to provide many other APIs to the applications 1220 and other software components/modules.

The frameworks 1218 (also sometimes referred to as middleware) provide a higher-level common infrastructure that may be used by the applications 1220 and/or other software components/modules. For example, the frameworks/middleware 1218 may provide various graphic user interface (GUI) functions, high-level resource management, high-level location services, and so forth. The frameworks/middleware 1218 may provide a broad spectrum of other APIs that may be utilized by the applications 1220 and/or other software components/modules, some of which may be specific to a particular operating system or platform.

The applications 1220 include built-in applications 1240 and/or third-party applications 1242. Examples of representative built-in applications 1240 may include, but are not limited to, a contacts application, a browser application, a book reader application, a location application, a media application, a messaging application, and/or a game application. Third-party applications 1242 may include any an application developed using the Android™ or iOS™ software development kit (SDK) by an entity other than the vendor of the particular platform, and may be mobile software running on a mobile operating system such as iOS™, Android™, Windows® Phone, or other mobile operating systems. The third-party applications 1242 may invoke the API calls 1224 provided by the mobile operating system such as operating system 1214 to facilitate functionality described herein.

The applications 1220 may use built-in operating system functions (e.g., kernel 1228, services 1230 and/or drivers 1232), libraries 1216, or frameworks/middleware 1218 to create user interfaces to interact with users of the system. Alternatively, or additionally, in some systems, interactions with a user may occur through a presentation layer, such as the presentation layer 1244. In these systems, the application/module "logic" can be separated from the aspects of the application/module that interact with a user.

Some software architectures use virtual machines. In the example of FIG. 12, this is illustrated by a virtual machine 1248. The virtual machine 1248 creates a software environment where applications/modules can execute as if they were executing on a hardware machine (such as the machine 1300 of FIG. 13, for example). The virtual machine 1248 is hosted by a host operating system (e.g., operating system 1214) and typically, although not always, has a virtual machine monitor 1246, which manages the operation of the virtual machine 1248 as well as the interface with the host operating system (i.e., operating system 1214). A software architecture executes within the virtual machine 1248 such as an operating system (OS) 1250, libraries 1252, frameworks 1254, applications 1256, and/or a presentation layer 1258. These layers of software architecture executing within the virtual machine 1248 can be the same as corresponding layers previously described or may be different.

Figure 13:
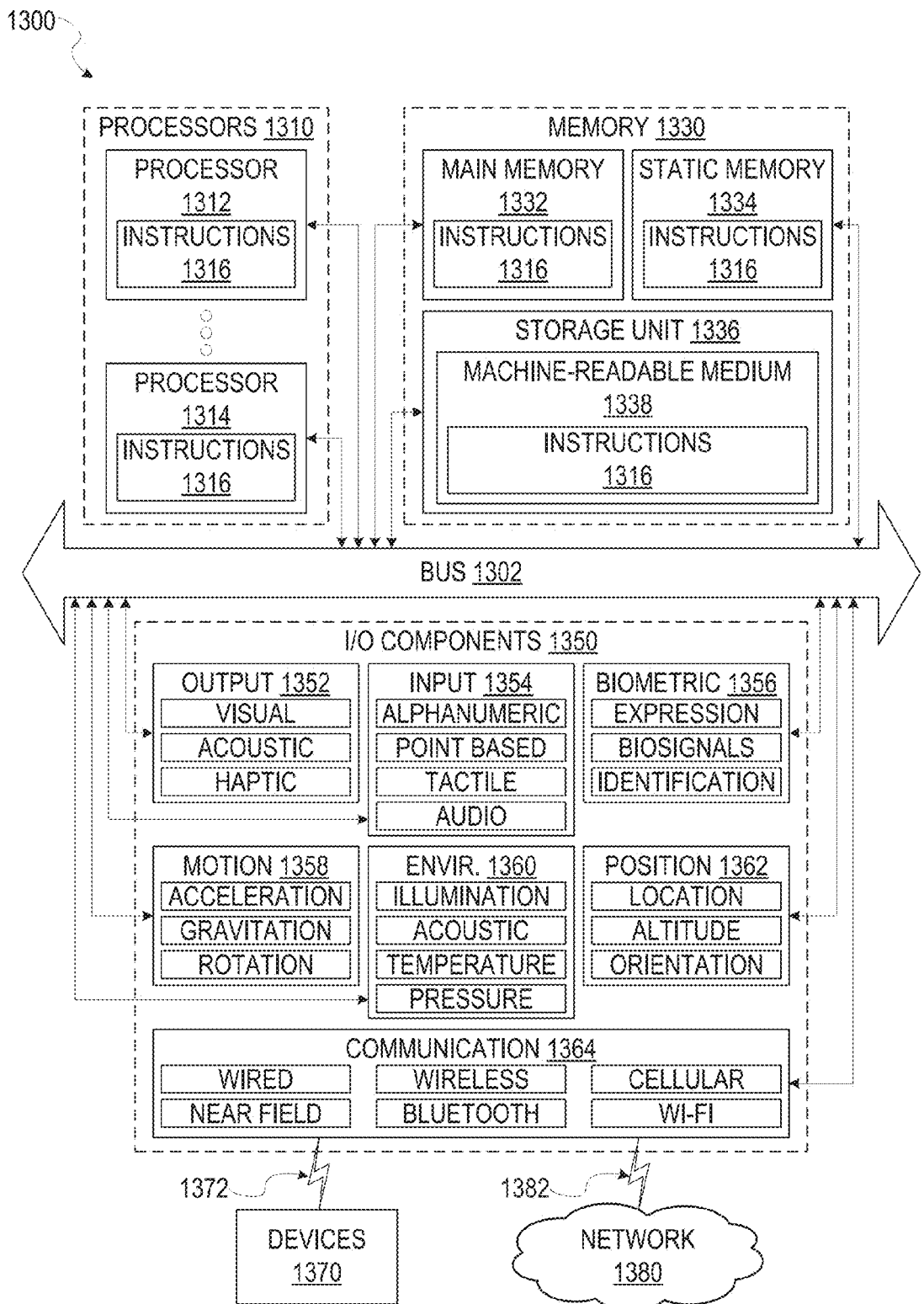
FIG. 13 is a block diagram illustrating components of a machine, according to some example embodiments, configured to read instructions from a machine-readable medium (e.g., a machine-readable storage medium) and perform any one or more of the methodologies discussed herein.

FIG. 13 is a block diagram illustrating components of a machine 1300, according to some example embodiments, configured to read instructions from a machine-readable medium (e.g., a machine-readable storage medium) and perform any one or more of the methodologies discussed herein. In some embodiments, the machine 110 is similar to the HMD 102 or the VR interaction device 202 shown in FIGS. 1-10. Specifically, FIG. 13 shows a diagrammatic representation of the machine 1300 in the example form of a computer system, within which instructions 1316 (e.g., software, a program, an application, an applet, an app, or other executable code) for causing the machine 1300 to perform any one or more of the methodologies discussed herein may be executed. As such, the instructions 1316 may be used to implement modules or components described herein. The instructions transform the general, non-programmed machine into a particular machine programmed to carry out the described and illustrated functions in the manner described. In alternative embodiments, the machine 1300 operates as a standalone device or may be coupled (e.g., networked) to other machines. In a networked deployment, the machine 1300 may operate in the capacity of a server machine or a client machine in a server-client network environment, or as a peer machine in a peer-to-peer (or distributed) network environment. The machine 1300 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1316, sequentially or otherwise, that specify actions to be taken by the machine 1300. Further, while only a single machine 1300 is illustrated, the term "machine" shall also be taken to include a collection of machines that individually or jointly execute the instructions 1316 to perform any one or more of the methodologies discussed herein.

The machine 1300 may include processors 1310, memory 1330, and input/output (I/O) components 1350, which may be configured to communicate with each other such as via a bus 1302. In an example embodiment, the processors 1310 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 1312 and a processor 1314 that may execute the instructions 1316. The term "processor" is intended to include multi-core processor that may comprise two or more independent processors (sometimes referred to as "cores") that may execute instructions contemporaneously. Although FIG. 13 shows multiple processors, the machine 1300 may include a single processor with a single core, a single processor with multiple cores (e.g., a multi-core processor), multiple processors with a single core, multiple processors with multiples cores, or any combination thereof.

The memory/storage 1330 may include a memory, such as a main memory 1332, a static memory 1334, or other memory, and a storage unit 1336, both accessible to the processors 1310 such as via the bus 1302. The storage unit 1336 and memory 1332, 1334 store the instructions 1316 embodying any one or more of the methodologies or functions described herein. The instructions 1316 may also reside, completely or partially, within the memory 1332, 1334, within the storage unit 1336, within at least one of the processors 1310 (e.g., within the processor's cache memory), or any suitable combination thereof, during execution thereof by the machine 1300. Accordingly, the memory 1332, 1334, the storage unit 1336, and the memory of processors 1310 are examples of machine-readable media 1338.

As used herein, "machine-readable medium" means a device able to store instructions and data temporarily or permanently and may include, but is not limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store the instructions 1316. The term "machine-readable medium" shall also be taken to include any medium, or combination of multiple media, that is capable of storing instructions (e.g., instructions 1316) for execution by a machine (e.g., machine 1300), such that the instructions, when executed by one or more processors of the machine 1300 (e.g., processors 1310), cause the machine 1300 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

The input/output (I/O) components 1350 may include a wide variety of components to receive input, provide output, produce output, transmit information, exchange information, capture measurements, and so on. The specific input/output (I/O) components 1350 that are included in a particular machine will depend on the type of machine. For example, portable machines such as mobile phones will likely include a touch input device or other such input mechanisms, while a headless server machine will likely not include such a touch input device. It will be appreciated that the input/output (I/O) components 1350 may include many other components that are not shown in FIG. 13. The input/output (I/O) components 1350 are grouped according to functionality merely for simplifying the following discussion and the grouping is in no way limiting. In various example embodiments, the input/output (I/O) components 1350 may include output components 1352 and input components 1354. The output components 1352 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1354 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the input/output (I/O) components 1350 may include biometric components 1356, motion components 1358, environmental components 1360, or position components 1362, among a wide array of other components. For example, the biometric components 1356 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1358 may include acceleration sensor components (e.g., accelerometer), gravitation sensor components, rotation sensor components (e.g., gyroscope), and so forth. The environmental components 1360 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 1362 may include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The input/output (I/O) components 1350 may include communication components 1364 operable to couple the machine 1300 to a network 1380 or devices 1370 via a coupling 1382 and a coupling 1372 respectively. For example, the communication components 1364 may include a network interface component or other suitable device to interface with the network 1380. In further examples, the communication components 1364 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1370 may be another machine or any of a wide variety of peripheral devices (e.g., a peripheral device coupled via a Universal Serial Bus (USB)).

Moreover, the communication components 1364 may detect identifiers or include components operable to detect identifiers. For example, the communication components 1364 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals).

In addition, a variety of information may be derived via the communication components 1362, such as, location via Internet Protocol (IP) geo-location, location via Wi-Fi® signal triangulation, location via detecting a NFC beacon signal that may indicate a particular location, and so forth.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within the scope of embodiments of the present disclosure as represented by the appended claims. The specification and drawings are, accordingly, to be regarded in an illustrative rather than a restrictive sense.

What is claimed is:

1. A system comprising:
  a first and a second hand tracking device, the first and second hand tracking devices being configured to provide position information associated with a first and a second hand of a user;
  one or more hardware processors;
  a memory; and
  a temporal manipulation module, executable by the one or more hardware processors, configured to perform operations comprising:
  recording changes made in a virtual reality (VR) environment involving the user, thereby creating a recorded content;
  detecting a first revolution gesture performed by the user with the first and second hand tracking devices, the first revolution gesture including the first and second hand tracking devices revolving in a circular motion about a common axis;
stopping the recording based on said detecting of the first revolution gesture;
rewinding through the recorded content based on the first revolution gesture; and
during the rewinding, displaying the recorded content in the VR environment, the displaying including altering the VR environment based on the recorded content.

2. The system of claim 1, wherein detecting the first revolution gesture further includes determining that the first and second hand tracking devices are vertically coplanar, wherein the first and second hand tracking devices revolve about each other.

3. The system of claim 1, wherein detecting the first revolution gesture further includes determining that a first finger of a left hand of the user and a second finger of a right hand of the user are vertically coplanar, wherein the first and second fingers revolve about each other.

4. The system of claim 1, wherein rewinding through the recorded content based on the first revolution gesture further includes rewinding through the recorded content at a temporal speed based on a separation distance between the first and the second hand tracking devices.

5. The system of claim 4, the operations further comprising:
during the rewinding, detecting a change in the separation distance between the first and the second hand tracking devices; and
altering the temporal speed based on the change in the separation distance.

6. The system of claim 1, the operations further comprising:
during the rewinding, detecting a second revolution gesture performed by the user with the first and second hand tracking devices, the second revolution gesture including the first and second hand tracking devices revolving in a circular motion opposite of the first revolution gesture;
based on the detection of the second revolution gesture, forwarding through the recorded content; and
displaying the recorded content in the VR environment during the forwarding.

7. The system of claim 1, wherein the recording, the rewinding, and the displaying are a part of a first temporal manipulation process, the operations further comprising:
detecting a temporal manipulation termination event at a point in time within the recorded content; and
terminating the first temporal manipulation process, thereby allowing the user to resume direct interaction with the VR environment.

8. A computer-implemented method comprising:
recording changes made in a virtual reality (VR) environment involving a user, thereby creating a recorded content;
detecting a first revolution gesture performed by the user with a first and a second hand tracking device, the first and second hand tracking devices being configured to provide position information associated with a first and a second hand of the user, the first revolution gesture including the first and second hand tracking devices revolving in a circular motion about a common axis;
stopping the recording based on said detecting of the first revolution gesture;
rewinding through the recorded content based on the first revolution gesture; and
during the rewinding, displaying the recorded content in the VR environment, the displaying including altering the VR environment based on the recorded content.

9. The method of claim 8, wherein detecting the first revolution gesture further includes determining that the first and second hand tracking devices are vertically coplanar, wherein the first and second hand tracking devices revolve about each other.

10. The method of claim 8, wherein detecting the first revolution gesture further includes determining that a first finger of a left hand of the user and a second finger of a right hand of the user are vertically coplanar, wherein the first and second fingers revolve about each other.

11. The method of claim 8, wherein rewinding through the recorded content based on the first revolution gesture further includes rewinding through the recorded content at a temporal speed based on a separation distance between the first and the second hand tracking devices.

12. The method of claim 11, the method further comprising:
during the rewinding, detecting a change in the separation distance between the first and the second hand tracking devices; and
altering the temporal speed based on the change in the separation distance.

13. The method of claim 8, the method further comprising:
during the rewinding, detecting a second revolution gesture performed by the user with the first and second hand tracking devices, the second revolution gesture including the first and second hand tracking devices revolving in a circular motion opposite of the first revolution gesture;
based on the detection of the second revolution gesture, forwarding through the recorded content; and
displaying the recorded content in the VR environment during the forwarding.

14. The method of claim 8, wherein the recording, the rewinding, and the displaying are a part of a first temporal manipulation process, the method further comprising:
detecting a temporal manipulation termination event at a point in time within the recorded content; and
terminating the first temporal manipulation process, thereby allowing the user to resume direct interaction with the VR environment.

15. A non-transitory machine-readable medium storing processor-executable instructions which, when executed by a processor, cause the processor to perform operations comprising:
recording changes made in a virtual reality (VR) environment involving a user, thereby creating a recorded content;
detecting a first revolution gesture performed by the user with a first and a second hand tracking device, the first and second hand tracking devices being configured to provide position information associated with a first and a second hand of the user, the first revolution gesture including the first and second hand tracking devices revolving in a circular motion about a common axis;
stopping the recording based on said detecting of the first revolution gesture;
rewinding through the recorded content based on the first revolution gesture; and
during the rewinding, displaying the recorded content in the VR environment, the displaying including altering the VR environment based on the recorded content.

16. The non-transitory machine-readable medium of claim 15, wherein detecting the first revolution gesture further includes determining that the first and second hand tracking devices are vertically coplanar, wherein the first and second hand tracking devices revolve about each other.

17. The non-transitory machine-readable medium of claim 15, wherein detecting the first revolution gesture further includes determining that a first finger of a left hand of the user and a second finger of a right hand of the user are vertically coplanar, wherein the first and second fingers revolve about each other.

18. The non-transitory machine-readable medium of claim 15, wherein rewinding through the recorded content based on the first revolution gesture further includes rewinding through the recorded content at a temporal speed based on a separation distance between the first and the second hand tracking devices, the operations further comprising:
 during the rewinding, detecting a change in the separation distance between the first and the second hand tracking devices; and
 altering the temporal speed based on the change in the separation distance.

19. The non-transitory machine-readable medium of claim 15, the operations further comprising:
 during the rewinding, detecting a second revolution gesture performed by the user with the first and second hand tracking devices, the second revolution gesture including the first and second hand tracking devices revolving in a circular motion opposite of the first revolution gesture;
 based on the detection of the second revolution gesture, forwarding through the recorded content; and
 displaying the recorded content in the VR environment during the forwarding.

20. The non-transitory machine-readable medium of claim 15, wherein the recording, the rewinding, and the displaying are a part of a first temporal manipulation process, the operations further comprising:
 detecting a temporal manipulation termination event at a point in time within the recorded content; and
 terminating the first temporal manipulation process, thereby allowing the user to resume direct interaction with the VR environment.

* * * * *